(12) United States Patent
Baird, III

(10) Patent No.: US 10,887,096 B2
(45) Date of Patent: Jan. 5, 2021

(54) METHODS AND APPARATUS FOR A DISTRIBUTED DATABASE INCLUDING ANONYMOUS ENTRIES

(71) Applicant: Swirlds, Inc., Richardson, TX (US)

(72) Inventor: Leemon C. Baird, III, Richardson, TX (US)

(73) Assignee: Swirlds, Inc., Richardson, TX (US)

(*) Notice: Subject to any disclaimer, the term of this patent is extended or adjusted under 35 U.S.C. 154(b) by 0 days.

(21) Appl. No.: 16/405,069

(22) Filed: May 7, 2019

(65) Prior Publication Data
US 2019/0268147 A1  Aug. 29, 2019

Related U.S. Application Data

(63) Continuation of application No. PCT/US2017/061135, filed on Nov. 10, 2017.
(Continued)

(51) Int. Cl.
*H04L 9/32* (2006.01)
*H04L 9/08* (2006.01)
(Continued)

(52) U.S. Cl.
CPC .......... *H04L 9/0866* (2013.01); *G06F 16/00* (2019.01); *G06F 16/182* (2019.01); *G06F 16/25* (2019.01);
(Continued)

(58) Field of Classification Search
CPC ..... H04L 9/30; H04L 9/3247; H04L 2209/38; H04L 2209/56; G06F 16/182; G06Q 20/065; G06Q 20/36–367
See application file for complete search history.

(56) References Cited

U.S. PATENT DOCUMENTS

| 5,991,414 A | 11/1999 | Garay et al. |
| 6,446,092 B1 | 9/2002 | Sutter |

(Continued)

FOREIGN PATENT DOCUMENTS

| CA | 2845306 A1 | 2/2013 |
| JP | 2010-225148 A | 10/2010 |

(Continued)

OTHER PUBLICATIONS

Bitcoin—"you-need-to-know" archived Sep. 5, 2015 and retrieved from https://web.archive.org/web/20150905115130/https://bitcoin.org/en/you-need-to-know on Jul. 13, 2020.*

(Continued)

*Primary Examiner* — Matthew T Henning
(74) *Attorney, Agent, or Firm* — Cooley LLP

(57) ABSTRACT

In some embodiments, an apparatus having at least a portion of a first instance of a distributed database at a first compute device is configured to be included within a group of compute devices that implement via a network operatively coupled to the group of compute devices the distributed database. The distributed database enables anonymous transfers of digital assets between compute devices via a transfer protocol such that an identity of a compute device associated with a private key corresponding to a public key logically related to a destination record is concealed among a set of compute devices including the first compute device and at least one second compute device.

15 Claims, 16 Drawing Sheets

Related U.S. Application Data

(60) Provisional application No. 62/420,147, filed on Nov. 10, 2016.

(51) Int. Cl.
  *G06F 16/182* (2019.01)
  *H04L 9/30* (2006.01)
  *G06F 16/00* (2019.01)
  *G06F 16/25* (2019.01)
  *G06Q 20/06* (2012.01)
  *G06Q 20/36* (2012.01)

(52) U.S. Cl.
  CPC ......... *G06Q 20/065* (2013.01); *G06Q 20/367* (2013.01); *H04L 9/30* (2013.01); *H04L 9/321* (2013.01); *H04L 9/3247* (2013.01); *H04L 2209/38* (2013.01); *H04L 2209/56* (2013.01)

(56) References Cited

U.S. PATENT DOCUMENTS

| | | |
|---|---|---|
| 6,966,836 B1 | 11/2005 | Rush et al. |
| 7,062,490 B2 | 6/2006 | Adya et al. |
| 7,240,060 B2 | 7/2007 | Adya et al. |
| 7,555,516 B2 | 6/2009 | Lamport |
| 7,558,883 B1 | 7/2009 | Lamport |
| 7,590,632 B1 | 9/2009 | Caronni et al. |
| 7,797,457 B2 | 9/2010 | Lamport |
| 7,844,745 B1 | 11/2010 | Darbyshire et al. |
| 7,849,223 B2 | 12/2010 | Malkhi et al. |
| 8,112,452 B2 | 2/2012 | Adya et al. |
| 8,423,678 B2 | 4/2013 | Darbyshire et al. |
| 8,478,114 B1 | 7/2013 | Beach et al. |
| 8,533,169 B1 | 9/2013 | Bailey et al. |
| 8,533,582 B2 | 9/2013 | Rao et al. |
| 8,571,519 B2 | 10/2013 | Ginzboorg |
| 8,600,944 B2 | 12/2013 | Bryant et al. |
| 8,612,386 B2 | 12/2013 | Tien et al. |
| 8,713,038 B2 | 4/2014 | Cohen et al. |
| 8,732,140 B2 | 5/2014 | Bird et al. |
| 8,766,980 B2 | 7/2014 | Miyashita et al. |
| 8,775,464 B2 | 7/2014 | Bulkowski et al. |
| 8,862,617 B2 | 10/2014 | Kesselman |
| 8,880,486 B2 | 11/2014 | Driesen et al. |
| 8,886,601 B1 | 11/2014 | Landau et al. |
| 8,914,333 B2 | 12/2014 | Bird et al. |
| 9,251,235 B1 | 2/2016 | Hurst et al. |
| 9,390,154 B1 | 7/2016 | Baird, III |
| 9,529,923 B1 | 12/2016 | Baird, III |
| 9,646,029 B1 | 5/2017 | Baird, III |
| 10,097,356 B2 * | 10/2018 | Zinder ................. H04L 9/3247 |
| 10,318,505 B2 | 6/2019 | Baird, III |
| 10,354,325 B1 * | 7/2019 | Skala .................... G06Q 40/04 |
| 10,375,037 B2 | 8/2019 | Baird, III et al. |
| 2001/0025351 A1 | 9/2001 | Kursawe et al. |
| 2002/0129087 A1 | 9/2002 | Cachin et al. |
| 2002/0186848 A1 | 12/2002 | Shaik |
| 2003/0147536 A1 | 8/2003 | Andivahis et al. |
| 2004/0172421 A1 | 9/2004 | Saito et al. |
| 2005/0038831 A1 | 2/2005 | Souder et al. |
| 2005/0102268 A1 | 5/2005 | Adya et al. |
| 2006/0136369 A1 | 6/2006 | Douceur et al. |
| 2006/0168011 A1 | 7/2006 | Lamport |
| 2007/0050415 A1 | 3/2007 | Amangau et al. |
| 2007/0165865 A1 | 7/2007 | Talvitie |
| 2008/0220873 A1 | 9/2008 | Lee et al. |
| 2008/0256078 A1 | 10/2008 | Bhashyam |
| 2008/0298579 A1 | 12/2008 | Abu-Amara |
| 2009/0150566 A1 | 6/2009 | Malkhi et al. |
| 2010/0172504 A1 | 7/2010 | Allen et al. |
| 2010/0257198 A1 | 10/2010 | Cohen et al. |
| 2011/0029689 A1 | 2/2011 | Darbyshire et al. |
| 2011/0173455 A1 | 7/2011 | Spalka et al. |
| 2011/0191251 A1 | 8/2011 | Al-Herz et al. |
| 2011/0196834 A1 | 8/2011 | Kesselman |
| 2011/0196873 A1 | 8/2011 | Kesselman |
| 2011/0250974 A1 | 10/2011 | Shuster |
| 2012/0078847 A1 | 3/2012 | Bryant et al. |
| 2012/0150802 A1 | 6/2012 | Popov et al. |
| 2012/0198450 A1 | 8/2012 | Yang et al. |
| 2012/0233134 A1 | 9/2012 | Barton et al. |
| 2012/0278293 A1 | 11/2012 | Bulkowski et al. |
| 2012/0303631 A1 | 11/2012 | Bird et al. |
| 2013/0110767 A1 | 5/2013 | Tatemura et al. |
| 2013/0145426 A1 | 6/2013 | Wright et al. |
| 2014/0012812 A1 | 1/2014 | Zunger |
| 2014/0108415 A1 | 4/2014 | Bulkowski et al. |
| 2014/0222829 A1 | 8/2014 | Bird et al. |
| 2014/0310243 A1 | 10/2014 | McGee et al. |
| 2015/0067002 A1 | 3/2015 | Shvachko et al. |
| 2015/0067819 A1 | 3/2015 | Shribman et al. |
| 2015/0200774 A1 | 7/2015 | Le Saint |
| 2015/0281344 A1 | 10/2015 | Grootwassink et al. |
| 2015/0294308 A1 * | 10/2015 | Pauker .................. G06Q 20/02 705/67 |
| 2016/0088424 A1 | 3/2016 | Polo et al. |
| 2016/0092988 A1 * | 3/2016 | Letourneau ............ G06Q 40/06 705/66 |
| 2016/0218875 A1 | 7/2016 | Le Saint et al. |
| 2016/0241392 A1 | 8/2016 | Vandervort |
| 2016/0342976 A1 * | 11/2016 | Davis ................ G06Q 20/3829 |
| 2017/0132257 A1 | 5/2017 | Baird, III |
| 2017/0300550 A1 | 10/2017 | Emberson et al. |
| 2017/0308548 A1 | 10/2017 | Baird, III |
| 2018/0018370 A1 | 1/2018 | Feiks et al. |
| 2018/0026782 A1 | 1/2018 | Xiao et al. |
| 2018/0173747 A1 | 6/2018 | Baird, III |
| 2019/0020629 A1 | 1/2019 | Baird, III et al. |
| 2019/0042619 A1 | 2/2019 | Baird, III |
| 2019/0129893 A1 | 5/2019 | Baird, III et al. |
| 2019/0286623 A1 | 9/2019 | Baird, III |

FOREIGN PATENT DOCUMENTS

| | | |
|---|---|---|
| JP | 2012-27685 A | 2/2012 |
| RU | 2376635 C2 | 12/2009 |
| RU | 2595493 C2 | 8/2016 |
| WO | WO 2017/198745 | 11/2017 |

OTHER PUBLICATIONS https://web.archive.org/web/20150811233709/https://en.wikipedia.org/wild/Paxos_(computer_science). Jun. 17, 2015, 15 pages.

Knutsson et al., "Peer-to-Peer Support for Massively Multiplayer Games", Department of Computer and Information Science, University of Pennsylvania, IEEE Infocom 2004.

GauthierDickey, Chris, et al. "Low latency and cheat-proof event ordering for peer-to-peer games." Proceedings of the 14th international workshop on Network and operating systems support for digital audio and video. ACM, 2004.

GauthierDickey, Chris, Virginia Lo, and Daniel Zappala. "Using n-trees for scalable event ordering in peer-to-peer games." Proceedings of the international workshop on Network and operating systems support for digital audio and video. ACM, 2005.

Lumezanu, Cristian, Neil Spring, and Bobby Bhattacharjee. "Decentralized message ordering for publish/subscribe systems." Proceedings of the ACM/IFIP/USENIX 2006 International Conference on Middleware. Springer-Verlag New York, Inc., 2006.

Moser, Louise E., and Peter M. Melliar-Smith, "Byzantine-resistant total ordering algorithms." Information and Computation 150.1 (1999): 75-111.

Défago, Xavier, et al., "Total Order broadcast and multicast algorithms: Taxonomy and survey." ACM Computing Surveys (CSUR) 36.4 (2004): 372-421.

U.S. Office Action dated Sep. 20, 2016 for U.S. Appl. No. 15/153,011, 18 pages.

Moser, Louise E., and Peter M. Melliar-Smith, "Total Ordering Algorithms for Asynchronous Byzantine Systems," International Workshop on Distributed Algorithms, 1995.

(56) References Cited

OTHER PUBLICATIONS

International Search Report and Written Opinion dated Jan. 5, 2017 for International Application No. PCT/US2016/049067, 16 pages.
U.S. Office Action dated May 30, 2017 for U.S. Appl. No. 15/205,688, 9 pages.
U.S. Office Action dated Oct. 26, 2017 for U.S. Appl. No. 15/205,688, 12 pages.
Lamport, Leslie, Robert Shostak, and Marshall Pease. "The Byzantine generals problem." ACM Transactions on Programming Languages and Systems (TOPLAS) 4(3): 382-401 (1982).
Wikipedia, Copy-on-write, Jul. 31, 2015, accessed Oct. 20, 2017 at https://en.wikipedia.org/w/index.php?title=Copy-on- write&oldid=673938951, 3 pages.
International Search Report and Written Opinion dated Feb. 1, 2018 for International Application No. PCT/US17/61135, 14 pages.
International Search Report and Written Opinion dated Mar. 8, 2018 for International Application No. PT/US1767329, 13 pages.
First Office Action issued by the Australian Patent Office for Patent Application No. 2016316777, dated Mar. 29, 2018, 5 pages.
Office Action issued by the Canadian Patent Office for Application No. 2,996,714, dated Apr. 11, 2018, 7 pages.
Non-Final Office Action issued by the United States Patent and Trademark Office for U.S. Appl. No. 15/205,688, dated Apr. 13, 2018, 9 pages.
Extended European Search Report issued by the European Patent Office for Application No. 16842700.3, dated May 14, 2018, 15 pages.
Nakamoto: "Bitcoin: A Peer-to-Peer Electronic Cash System," Jan. 13, 2009 (Jan. 13, 2009), Retrieved from the Internet: URL:https://web.archive.org/web/20090131115053/http://www.bitcoin.org/bitcoin.pdf [retrieved on Jun. 30, 2017], 9 pages.
Extended European Search Report issued by the European Patent Office dated Jul. 31, 2018, 12 pages.
Kwon, J., "Tendermint: Consensus without Mining," Mar. 19, 2015, Retrieved from the Internet: URL:https://web.archive.org/web/2015031903 5333if /http://tendermint.com:80/docs/tendermint.pdf [retrieved on Jul. 19, 2018], 11 pages.
Bonneau e tal., SoK: Research Perspectives and Challenges for Bitcoin and Cryptocurrencies, International Association for Cryptologic Research vol. 20150323:173252, 18 pages (2015), DOI: 10.1109/SP.2015.14 [retrieved on Mar. 23, 2015].
Extended European Search Report issued by the European Patent Office for Application No. 18177124.7 , dated Jul. 31, 2018, 14 pages.
Extended European Search Report issued by the European Patent Office for Application No. 18177127.0, dated Jul. 31, 2018, 10 pages.
Extended European Search Report issued by the European Patent Office for Application No. 18177129.6, dated Aug. 31, 2018, 12 pages.
Office Action issued by the Korean Patent Office for Application No. 10-2018-7008784, dated Aug. 22, 2018, non-English, 4 pages including English translation summary of OA.
Office Action issued by the Japanese Patent Office for Application No. 2018-521625, dated Sep. 26, 2018, 11 pages including English translation.
Invitation to Pay Additional Fees issued by the International Searching Authority for Application No. PCT/US18/41625, dated Sep. 18, 2018, 3 pages.
Non-Final Office Action issued by the United States Patent and Trademark Office for U.S. Appl. No. 16/032,652, dated Oct. 12, 2018, 32 pages.
Examination Report No. 2 issued by the Australian Patent Office for Application No. 2016316777, dated Oct. 30, 2018, 5 pages.
Notice of Eligibility for Grant and Supplementary Examination Report issued by the Intellectual Property Office of Singapore for Application No. 11201801311T, dated Nov. 26, 2018, 5 pages.
International Search Report and Written Opinion issued by the International Searching Authority for Application No. PCT/US18/41625, dated Nov. 20, 2018, 18 pages.
Examination Report No. 3 issued by the Australian Patent Office for Application No. 2016316777, dated Dec. 20, 2018, 5 pages.
Alfred V. Aho, John E. Hoperoft, and Jeffrey Ullman. 1983. Data Structures and Algorithms (1st ed.). Addison-Wesley Longman Publishing Co., Inc., Boston, MA, USA, 620 pages.
Notice of Preliminary Rejection issued by the Korean Patent Office for Application 10-2018-7008784, dated Dec. 28, 2018, 4 pages including English translation.
Office Action issued by the Canadian Patent Office for Application No. 3,027,398, dated Jan. 7, 2019, 7 pages.
Invitation to Pay Additional Fees issued by the International Searching Authority for Application No. PCT/US2018/058432, dated Jan. 16, 2019, 2 pages.
Notice of eligibility for Grant and Supplementary Examination Report issued by the Intellectual Property Office of Singapore for Application No. 10201805466S, dated Jan. 28, 2019, 5 pages.
Notice of Acceptance issued by the Australian Patent Office for Patent Application No. 2016316777, dated Feb. 19, 2019, 3 pages.
Notification of the First Office Action issued by the Chinese Patent Office for Patent Application No. 201680061456.6, dated Feb. 1, 2019, 18 pages including English translation.
Sompolinsky, Yonatan and Zohar, Aviv, "Secure High-Rate Transaction Processing in Bitcoin," International Conference on Financial Cryptography and Data Security (FC 2015), Springer,2015, 31 pages cited as 7(16):507-527,<DOI: 10.1007/978-3-662-47854-7_32>.
International Search Report and Written Opinion issued by the International Searching Authority for Application No. PCT/US18/58432, dated Mar. 29, 2019, 11 pages.
Supplementary Examination Report and Notice of Eligibility issued by the Singapore Patent Office for Application No. 10201805458P, dated Apr. 8, 2019, 5 pages.
Office Action issued by the European Patent Office for Application No. 16842700.3, dated Apr. 12, 2019, 10 pages.
Non-final Office Action issued by the United States Patent and Trademark Office for U.S. Appl. No. 16/176,125, dated Apr. 26, 2019, 15 pages.
Boneh, "Functional Encryption: A New Vision for Public-Key Cryptography," Communication of the ACM 55:56-64 (2012).
Office Action issued by the European Patent Office for Application No. 18177122.1, dated Apr. 12, 2019, 9 pages.
Office Action issued by the Russian Patent Office for Application No. 2018110579, dated Apr. 4, 2019, 14 pages including English translation.
Office Action issued by the Australian Patent Office for Application No. 2019202138, dated May 15, 2019, 4 pages.
International Preliminary Report on Patentability dated Jun. 25, 2019 for International Application No. PCT/US1767329, 7 pages.
Office Action issued by the European Patent Office for Application No. 18177124.7, dated Jul. 15, 2019, 9 pages.
Office Action issued by the European Patent Office for Application No. 18177127.0, dated Jul. 15, 2019, 7 pages.
Office Action issued by the Canadian Patent Office for Application No. 3,027,398, dated Aug. 12, 2019, 4 pages.
Non-Final Office Action issued by the United States Patent and Trademark Office for U.S. Appl. No. 15/366,584, dated Sep. 12, 2019, 6 pages.
Office Action issued by the Japanese Patent Office for Application No. 2019-081303, 4 pages including English translation.
Office Action issued by the European Patent Office for Application No. 16842700.3, dated Nov. 4, 2019, 10 pages.
Office Action issued by the European Patent Office for Application No. 18177122.1, dated Nov. 4, 2019, 9 pages.
Baird, "Hashgraph Consensus: Fair, Fast Byzantine Fault Tolerance," Swirlds Tech Report TR-2016-01, dated Mary 31, 2016, 24 pages.
Baird et al., "Hedera: A Governing Council & Public Hashgraph Network," Whitepaper, v.1.4, dated Oct. 17, 2018, 76 pages.
Baird, "Hashgraph Consensus: Detailed Examples," Swirlds Tech Report Swirlds-TR-2016-02, dated Dec. 11, 2016, 29 pages.
Extended European Search Report issued by the European Patent Office for Application No. 17870565.3, dated May 25, 2020, 8 pages.

(56) References Cited

OTHER PUBLICATIONS

Office Action issued by the Russian Patent Office for Application No. 2019115233, dated Sep. 24, 2020, 13 pages including English translation.

* cited by examiner

An event is a tuple $e = \{d, h, t, c, s\}$ where:

$d = data(e)$ = the "payload" data, which may include transactions.
$h = hashes(e)$ = a list of hashes of the event's parents, self-parent first.
$t = time(e)$ = creator's claimed date and time of the event's creation.
$c = creator(e)$ = creator's ID number.
$s = sig(e)$ = creator's digital signature of $\{d,h,t,c\}$.
$n$ = the number of members in the population
$m = 1 + \lfloor 2n/3 \rfloor$
$first$ = the unique event that has no parents
$E$ = the set of all events
$T$ = set of all possible $(time, date)$ pairs
$\mathbb{B} = \{true, false\}$
$\mathbb{N} = \{0, 1, 2, ...\}$ $$\begin{aligned}
ancestor &: E \times E \to \mathbb{B} \\
selfAncestor &: E \times E \to \mathbb{B} \\
see &: E \times E \to \mathbb{B} \\
stronglySee &: E \times E \to \mathbb{B} \\
parentRound &: E \to \mathbb{N} \\
witness &: E \to \mathbb{B} \\
round &: E \to \mathbb{N} \\
roundDiff &: E \times E \to \mathbb{I} \\
votes &: E \times E \times \mathbb{B} \to \mathbb{N} \\
voteFraction &: E \times E \to \mathbb{R} \\
vote &: E \times E \to \mathbb{B} \\
decide &: E \times E \to \mathbb{B} \\
allFamous &: \mathbb{I} \to 2^E \\
famous &: E \to \mathbb{B} \\
roundReceived &: E \to \mathbb{N} \\
timeReceived &: E \to T
\end{aligned}$$

FIG. 13A $$
\begin{aligned}
\text{ancestor}(x,y) &= (x = y) \lor (\exists z \in \text{parents}(x) : \text{ancestor}(z,y)) \\
\text{selfAncestor}(x,y) &= \text{ancestor}(x,y) \land ((\text{selfParent}(x) = y) \lor \text{selfAncestor}(\text{selfParent}(x),y)) \\
\text{see}(x,y) &= \text{ancestor}(x,y) \land \lnot (\exists a,b,c \in E : \\
&\quad (\text{ancestor}(y,a) \land \text{ancestor}(y,b) \land c \in \text{parents}(a) \land c \in \text{parents}(b)) \land \\
&\quad \text{creator}(a) = \text{creator}(b) = \text{creator}(c)) \\
\text{stronglySee}(x,y) &= \text{see}(x,y) \land (\exists S \in 2^E : (|S| = m) \land (z \in S \iff (\text{see}(x,z) \land \text{see}(z,y)))) \\
\text{parentRound}(x) &= \begin{cases} 0 & \text{if } x = first \\ \max_{y \in \text{parents}(x)} \text{round}(y) & \text{otherwise} \end{cases} \\
\text{witness}(x) &= \exists S \in 2^E : (|S| = m \land \\
&\quad (\forall y \in S : (\text{round}(y) = \text{parentRound}(x) \land \text{stronglySee}(x,y)))) \\
\text{round}(x) &= \begin{cases} 1 + \text{parentRound}(x) & \text{if witness}(x) \\ \text{parentRound}(x) & \text{otherwise} \end{cases} \\
\text{roundDiff}(x,y) &= \text{round}(x) - \text{round}(y) \\
\text{votes}(x,y,v) &= |\{z \in E \mid \text{see}(x,y) \land \text{roundDiff}(x,z) = 1 \land \\
&\quad \text{stronglySee}(x,z) \land \text{vote}(z,y) = v\}| \\
\text{voteFraction}(x,y) &= \text{votes}(x,true) / (\text{votes}(x,true) + \text{votes}(x,false)) \\
\text{vote}(x,y) &= \begin{cases} \text{see}(x,y) & \text{if roundDiff}(x,y) = 1 \\ (\text{voteFraction}(x,y) >= 1/2) & \text{if (roundDiff}(x,y) \bmod 5 \neq 1) \lor \\ & \quad |\text{voteFraction}(x,y) - 1/2| > 1/6 \\ (1 = \text{LSB}(\text{signature}(x))) & \text{otherwise} \end{cases} \\
\text{decide}(x,y) &= \text{vote}(x,y) \land (\text{roundDiff}(x,y) \bmod 5 \neq 1) \land (\text{voteFraction}(x,y) > 2/3) \\
\text{allFamous}(r) &= \{x \in E \mid \text{famous}(x) \land \text{round}(x) = r\} \\
\text{famous}(x) &= \text{witness}(x) \land \exists y \in E : \text{decide}(y,x) \\
\text{roundReceived}(x) &= \min_{r \in \mathbb{N}} (|\{y \in E \mid \text{round}(y) = r \land \text{famous}(y) \land \text{see}(y,x)\}| / \\
&\quad |\{y \in E \mid \text{round}(y) = r \land \text{famous}(y)\}| >= 1/2) \\
\text{timeReceived}(x) &= \text{median}(\text{time}(y) \mid y \in E \land \text{see}(y,x) \land \\
&\quad (\exists z \in E : \text{round}(z) = \text{roundReceived}(x) \land \text{selfAncestor}(z,y)) \land \\
&\quad \lnot (\exists w \in E : \text{selfAncestor}(y,w) \land \text{see}(w,x)))
\end{aligned}
$$

FIG. 13B

An event is a tuple $e = \{d, h, t, c, s\}$ where:

$d = data(e)$ = the "payload" data, which may include transactions.
$h = hashes(e)$ = a list of hashes of the event's parents, self-parent first.
$t = time(e)$ = creator's claimed date and time of the event's creation.
$i = creator(e)$ = creator's ID number.
$s = sig(e)$ = creator's digital signature of $\{d,h,t,c\}$.
$n$ = the number of members in the population
$c$ = frequency of coin rounds (e.g., $c = 6$)
$E$ = (the set of all events) $\cup \{\varnothing\}$
$\mathbb{T}$ = set of all possible $(time, date)$ pairs
$\mathbb{B}$ = $\{true, false\}$
$\mathbb{N}$ = $\{0, 1, 2, ...\}$ $$\begin{aligned}
\text{parents} &: E \to 2^E \\
\text{selfParent} &: E \to E \\
\text{ancestor} &: E \times E \to \mathbb{B} \\
\text{selfAncestor} &: E \times E \to \mathbb{B} \\
\text{see} &: E \times E \to \mathbb{B} \\
\text{stronglySee} &: E \times E \to \mathbb{B} \\
\text{parentRound} &: E \to \mathbb{N} \\
\text{roundInc} &: E \to \mathbb{B} \\
\text{round} &: E \to \mathbb{N} \\
\text{witness} &: E \to \mathbb{B} \\
\text{roundDiff} &: E \times E \to \mathbb{I} \\
\text{votes} &: E \times E \times \mathbb{B} \to \mathbb{N} \\
\text{fractTrue} &: E \times E \to \mathbb{R} \\
\text{decide} &: E \times E \to \mathbb{B} \\
\text{vote} &: E \times E \to \mathbb{B} \\
\text{famous} &: E \to \mathbb{B} \\
\text{roundReceived} &: E \to \mathbb{N} \\
\text{timeReceived} &: E \to \mathbb{T}
\end{aligned}$$

FIG. 14A $\text{parents}(x) = \text{set of parents of event } x$ $\text{selfParent}(x) = \text{the self-parent of event } x, \text{ or } \emptyset \text{ if none}$ $\text{ancestor}(x, y) = (x \neq \emptyset) \wedge ((x = y) \vee (\exists z \in \text{parents}(x) : \text{ancestor}(z, y)))$ $\text{selfAncestor}(x, y) = (x \neq \emptyset) \wedge ((x = y) \vee \text{selfAncestor}(\text{selfParent}(x), y))$ $\text{see}(x, y) = \text{ancestor}(x, y) \wedge \neg(\exists a, b \in E : \text{creator}(y) = \text{creator}(a) = \text{creator}(b) \wedge$
$\qquad \text{ancestor}(x, a) \wedge \text{ancestor}(x, b) \wedge \neg \text{selfAncestor}(a, b) \wedge \neg \text{selfAncestor}(b, a))$ $\text{stronglySee}(x, y) = \text{see}(x, y) \wedge (\exists S \in 2^E : (|S| > 2n/3) \wedge (z \in S \iff (\text{see}(x, z) \wedge \text{see}(z, y))))$ $\text{parentRound}(x) = \max(\{0\} \cup \{\text{round}(y) | y \in \text{parents}(x)\})$ $\text{roundInc}(x) = \exists S \in 2^E : (|S| > 2n/3 \wedge$
$\qquad (\forall y \in S : (\text{round}(y) = \text{parentRound}(x) \wedge \text{stronglySee}(x, y))))$ $\text{round}(x) = \text{parentRound}(x) + \begin{cases} 1 & \text{if roundInc}(x) \\ 0 & \text{otherwise} \end{cases}$ $\text{witness}(x) = (\text{selfParent}(x) = \emptyset) \vee (\text{round}(x) > \text{round}(\text{selfParent}(x)))$ $\text{roundDiff}(x, y) = \text{round}(x) - \text{round}(y)$ $\text{votes}(x, y, v) = |\{z \in E \mid \text{roundDiff}(x, z) = 1 \wedge \text{stronglySee}(x, z) \wedge \text{vote}(z, y) = v\}|$ $\text{fractTrue}(x, y) = \dfrac{\text{votes}(x, y, \text{true})}{\text{votes}(x, y, \text{true}) + \text{votes}(x, y, \text{false})}$ $\text{decide}(x, y) = (x \neq \emptyset) \wedge (\text{roundDiff}(x, y) > 1) \wedge (\text{decide}(\text{selfParent}(x), y) \vee$
$\qquad (\text{witness}(x) \wedge (\text{roundDiff}(x, y) \mod c \neq 1) \wedge \neg(\tfrac{1}{3} \leq \text{fractTrue}(x, y) \leq \tfrac{2}{3})))$ $\text{vote}(x, y) = \begin{cases} \text{vote}(\text{selfParent}(x), y) & \text{if } (\neg \text{witness}(x)) \vee \text{decide}(\text{selfParent}(x), y) \\ 1 = \text{middleBit}(\text{signature}(x)) & \text{if witness}(x) \\ & \wedge \neg \text{decide}(\text{selfParent}(x), y) \\ & \wedge (\text{roundDiff}(x, y) \neq 1) \\ & \wedge (\text{roundDiff}(x, y) \mod c = 1) \\ \text{fractTrue}(x, y) \geq \tfrac{1}{2} & \text{otherwise} \end{cases}$ $\text{famous}(x) = \text{witness}(x) \wedge \exists y \in E : \text{decide}(y, x) \wedge \text{vote}(y, x)$ $\text{roundReceived}(x) = \min_{r \in \mathbb{R}} \left( \dfrac{|\{y \in E \mid \text{round}(y) = r \wedge \text{famous}(y) \wedge \text{see}(y, x)\}|}{|\{y \in E \mid \text{round}(y) = r \wedge \text{famous}(y)\}|} \geq 1/2 \right)$ $\text{timeReceived}(x) = \text{median}(\{\text{time}(y) | y \in E \wedge \text{see}(y, x) \wedge$
$\qquad (\exists z \in E : \text{round}(z) = \text{roundReceived}(x) \wedge \text{selfAncestor}(z, y)) \wedge$
$\qquad \neg(\exists w \in E : \text{selfAncestor}(y, w) \wedge \text{see}(w, x)))\}$

FIG. 14B

METHODS AND APPARATUS FOR A DISTRIBUTED DATABASE INCLUDING ANONYMOUS ENTRIES

CROSS-REFERENCE TO RELATED PATENT APPLICATIONS

This patent application is a continuation of PCT Application No. PCT/US2017/061135, filed Nov. 10, 2017 and entitled "METHODS AND APPARATUS FOR A DISTRIBUTED DATABASE INCLUDING ANONYMOUS ENTRIES," which claims priority to U.S. Provisional Patent Application Ser. No. 62/420,147 filed on Nov. 10, 2016 and entitled "METHODS AND APPARATUS FOR A DISTRIBUTED DATABASE INCLUDING ANONYMOUS ENTRIES," which is incorporated herein by reference in its entirety.

BACKGROUND

Embodiments described herein relate generally to a database system and more particularly to methods and apparatus for implementing a database system across multiple devices in a network.

Some known distributed database systems attempt to achieve consensus for values within the distributed database systems (e.g., regarding the order in which transactions occur). For example, an online multiplayer game might have many computer servers that users can access to play the game. If two users attempt to pick up a specific item in the game at the same time, then it is important that the servers within the distributed database system eventually reach agreement on which of the two users picked up the item first.

Such distributed consensus can be handled by methods and/or processes such as the Paxos algorithm or its variants. Under such methods and/or processes, one server of the database system is set up as the "leader," and the leader decides the order of events. Events (e.g., within multiplayer games) are forwarded to the leader, the leader chooses an ordering for the events, and the leader broadcasts that ordering to the other servers of the database system.

Such known approaches, however, use a server operated by a party (e.g., central management server) trusted by users of the database system (e.g., game players). Accordingly, a need exists for methods and apparatus for a distributed database system that does not require a leader or a trusted third party to operate the database system.

Other distributed databases are designed to have no leader, but transactions within such distributed databases are public. Thus, other instances of the distributed database can identify which instances of the distributed database initiated certain transactions.

Accordingly, a need exists for a distributed database system that achieves consensus without a leader and is able to maintain anonymity of transactions.

SUMMARY

In some embodiments, an apparatus includes at least a portion of a first instance of a distributed database at a first compute device configured to be included within a group of compute devices that implement via a network operatively coupled to the group of compute devices, the distributed database. The distributed database includes a first record logically related to a first public key associated with the first compute device. The apparatus also includes a processor operatively coupled to the portion of the first instance of the distributed database. The processor is configured to receive from a second compute device from the group of compute devices, a first public key associated with the second compute device and (1) encrypted with the first public key associated with the first compute device and (2) logically related to a second record of the distributed database. The processor is configured to decrypt the first public key associated with the second compute device with a private key paired to the first public key associated with the first compute device. The processor is configured to send to the second compute device a second public key associated with the first compute device and encrypted with a second public key associated with the second compute device. Both the first compute device and the second compute device are configured to digitally sign or authorize a transfer from a source record associated with the first public key associated with the first compute device, and from a source record associated with the second public key associated with the second compute device, to a destination record associated with the second public key associated with the first compute device and to a destination record associated with the first public key associated with the second compute device. This transfer then transfers value from the two source records to the two destination records.

BRIEF DESCRIPTION OF THE DRAWINGS

FIGS. 13A-13B illustrate an example consensus method for use with a hashgraph, according to an embodiment.

FIGS. 14A-14B illustrate an example consensus method for use with a hashgraph, according to another embodiment.

DETAILED DESCRIPTION

Figure 1:
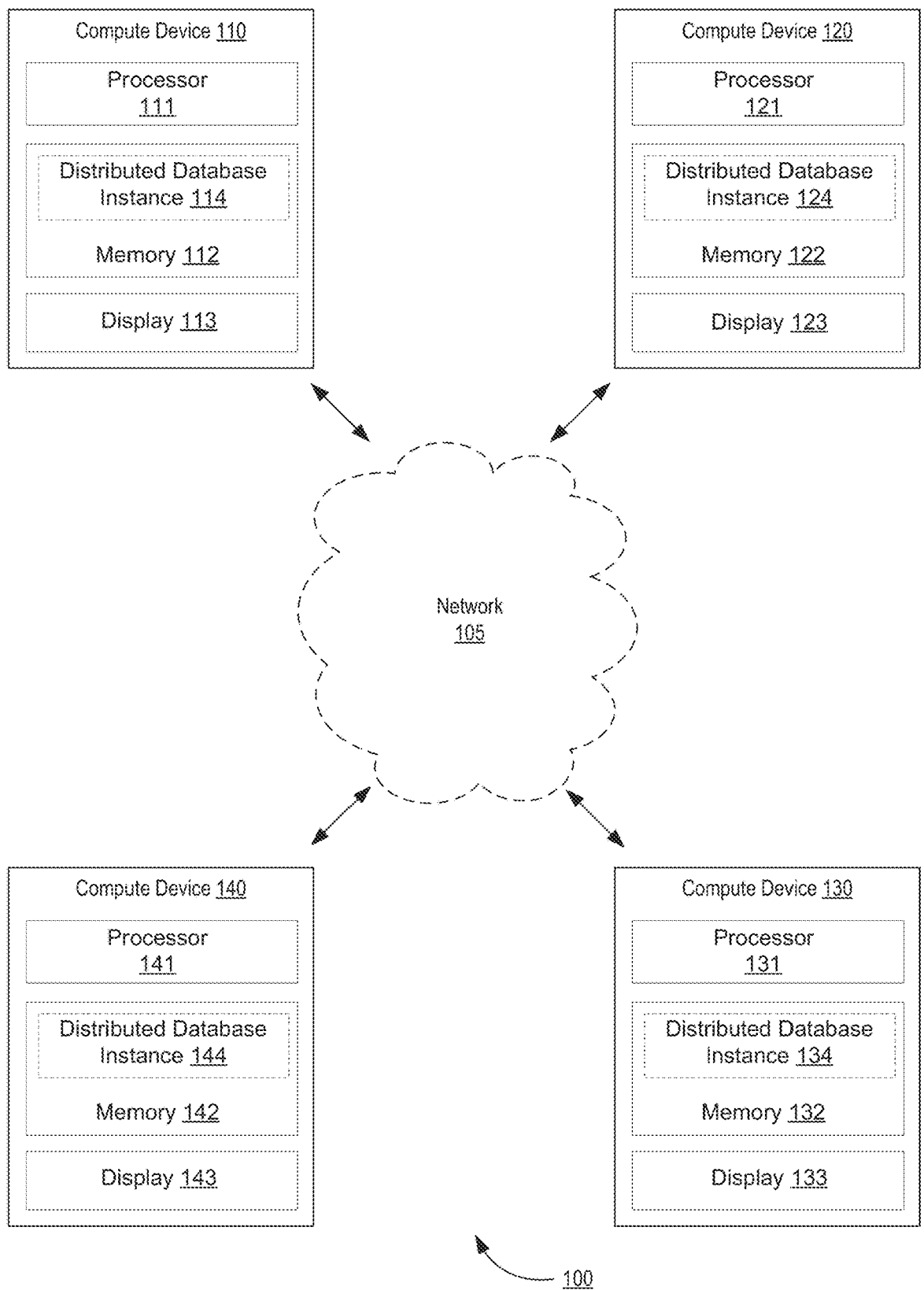
FIG. 1 is a high level block diagram that illustrates a distributed database system, according to an embodiment.

In some embodiments, an apparatus includes at least a portion of a first instance of a distributed database at a first compute device configured to be included within a group of compute devices that implement via a network operatively coupled to the group of compute devices, the distributed database. The distributed database includes a first record logically related to a first public key associated with the first compute device. The apparatus also includes a processor operatively coupled to the portion of the first instance of the distributed database. The processor is configured to receive from a second compute device from the group of compute devices, a first public key associated with the second compute device and (1) encrypted with the first public key associated with the first compute device and (2) logically related to a second record of the distributed database. The processor is configured to decrypt the first public key associated with the second compute device with a private key paired to the first public key associated with the first compute device. The processor is configured to send to the second compute device a second public key associated with the first compute device and encrypted with a second public key associated with the second compute device. Both the first compute device and the second compute device are configured to digitally sign or authorize a transfer from a source record associated with the first public key associated with the first compute device, and from a source record associated with the second public key associated with the second compute device, to a destination record associated with the second public key associated with the first compute device and to a destination record associated with the first public key associated with the second compute device. This transfer then transfers value from the two source records to the two destination records.

In some embodiments, an apparatus includes a first instance of at least a portion of a distributed database at a first compute device configured to be included within a group of compute devices that implement via a network operatively coupled to the group of compute devices, the distributed database. The distributed database includes a first record logically related to a first public key associated with the first compute device. The processor of the first compute device is operatively coupled to the first instance of the at least the portion of the distributed database. The processor is configured to receive from a second compute device from the group of compute devices, a first public key associated with the second compute device, encrypted with the first public key associated with the first compute device, and a value requested to be transferred from a second record logically related to a second public key associated with the second compute device to a destination record to be created in the distributed database. Both the first compute device and the second compute device are configured to send a signal to post into the distributed database a transfer command configured to transfer the value from the first record and the second record to a third record and a fourth record, thereby creating the third and fourth records in the distributed database. The third record is logically related to a second public key associated with the first compute device and the fourth record is logically related to the first public key associated with the second compute device. The transfer command is signed with a private key paired to the first public key associated with the first compute device, and also signed with a private key paired to the second public key associated with the second compute device, and configured to be executed such that an identity of a compute device associated with a private key corresponding to the second public key associated with the first compute device is concealed among a set of compute devices including the first compute device and the second compute device.

In some embodiments, an apparatus includes a first instance of at least a portion of a distributed database at a first compute device configured to be included within a group of compute devices that implement via a network operatively coupled to the group of compute devices, the distributed database. The distributed database includes a first record logically related to a first public key, a second record logically related to a second public key, a third record logically related to a third public key and a fourth record logically related to a fourth public key. The processor of the first compute device is operatively coupled to the first instance of the at least the portion of the distributed database. The processor is configured to receive an indication of a database operation that includes a request to transfer a value associated with the first record and a value associated with the second record to both the third record and the fourth record. The transfer command is configured to be executed such that the transfer command conceals an identity of a compute device associated with a private key corresponding to the third public key and an identity of a compute device associated with a private key corresponding to the fourth public key.

As used herein, a module can be, for example, any assembly and/or set of operatively-coupled electrical components associated with performing a specific function, and can include, for example, a memory, a processor, electrical traces, optical connectors, software (executing in hardware) and/or the like.

As used in this specification, the singular forms "a," "an" and "the" include plural referents unless the context clearly dictates otherwise. Thus, for example, the term "module" is intended to mean a single module or a combination of modules. For instance, a "network" is intended to mean a single network or a combination of networks.

FIG. 1 is a high level block diagram that illustrates a distributed database system 100, according to an embodiment. FIG. 1 illustrates a distributed database 100 implemented across four compute devices (compute device 110, compute device 120, compute device 130, and compute device 140), but it should be understood that the distributed database 100 can use a set of any number of compute devices, including compute devices not shown in FIG. 1. The network 105 can be any type of network (e.g., a local area network (LAN), a wide area network (WAN), a virtual network, a telecommunications network) implemented as a wired network and/or wireless network and used to operatively couple compute devices 110, 120, 130, 140. As described in further detail herein, in some embodiments, for example, the compute devices are personal computers connected to each other via an Internet Service Provider (ISP) and the Internet (e.g., network 105). In some embodiments, a connection can be defined, via network 105, between any two compute devices 110, 120, 130, 140. As shown in FIG. 1, for example, a connection can be defined between compute device 110 and any one of compute device 120, compute device 130, or compute device 140.

In some embodiments, the compute devices 110, 120, 130, 140 can communicate with each other (e.g., send data to and/or receive data from) and with the network via intermediate networks and/or alternate networks (not shown in FIG. 1). Such intermediate networks and/or alternate networks can be of a same type and/or a different type of network as network 105.

Each compute device 110, 120, 130, 140 can be any type of device configured to send data over the network 105 to send and/or receive data from one or more of the other compute devices. Examples of compute devices are shown in FIG. 1. Compute device 110 includes a memory 112, a processor 111, and an output device 113. The memory 112 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 112 of the compute device 110 includes data associated with an instance of a distributed database (e.g., distributed database instance 114). In some embodiments, the memory 112 stores instructions to cause the processor to execute modules, processes and/or functions associated with sending to and/or receiving from another instance of a distributed database (e.g., distributed database instance 124 at compute device 120) a record of a synchronization event, a record of prior synchronization events with other compute devices, an order of synchronization events, a value for a parameter (e.g., a database field quantifying a transaction, a database field quantifying an order in which events occur, and/or any other suitable field for which a value can be stored in a database).

Distributed database instance 114 can, for example, be configured to manipulate data, including storing, modifying, and/or deleting data. In some embodiments, distributed database instance 114 can be a relational database, object database, post-relational database, and/or any other suitable type of database. For example, the distributed database instance 114 can store data related to any specific function and/or industry. For example, the distributed database instance 114 can store financial transactions (of the user of the compute device 110, for example), including a value and/or a vector of values related to the history of ownership of a particular financial instrument. In general, a vector can be any set of values for a parameter, and a parameter can be any data object and/or database field capable of taking on different values. Thus, a distributed database instance 114 can have a number of parameters and/or fields, each of which is associated with a vector of values. The vector of values is used to determine the actual value for the parameter and/or field within that database instance 114.

In some instances, the distributed database instance 114 can also be used to implement other data structures, such as a set of (key, value) pairs. A transaction recorded by the distributed database instance 114 can be, for example, adding, deleting, or modifying a (key, value) pair in a set of (key, value) pairs.

In some instances, the distributed database system 100 or any of the distributed database instances 114, 124, 134, 144 can be queried. For example, a query can consist of a key, and the returned result from the distributed database system 100 or distributed database instances 114, 124, 134, 144 can be a value associated with the key. In some instances, the distributed database system 100 or any of the distributed database instances 114, 124, 134, 144 can also be modified through a transaction. For example, a transaction to modify the database can contain a digital signature by the party authorizing the modification transaction.

The distributed database system 100 can be used for many purposes, such as, for example, storing attributes associated with various users in a distributed identity system. For example, such a system can use a user's identity as the "key," and the list of attributes associated with the users as the "value." In some instances, the identity can be a cryptographic public key with a corresponding private key known to that user. Each attribute can, for example, be digitally signed by an authority having the right to assert that attribute. Each attribute can also, for example, be encrypted with the public key associated with an individual or group of individuals that have the right to read the attribute. Some keys or values can also have attached to them a list of public keys of parties that are authorized to modify or delete the keys or values.

In another example, the distributed database instance 114 can store data related to Massively Multiplayer Games (MMGs), such as the current status and ownership of gameplay items. In some instances, distributed database instance 114 can be implemented within the compute device 110, as shown in FIG. 1. In other instances, the instance of the distributed database is accessible by the compute device (e.g., via a network), but is not implemented in the compute device (not shown in FIG. 1).

The processor 111 of the compute device 110 can be any suitable processing device configured to run and/or execute distributed database instance 114. For example, the processor 111 can be configured to update distributed database instance 114 in response to receiving a signal from compute device 120, and/or cause a signal to be sent to compute device 120, as described in further detail herein. More specifically, as described in further detail herein, the processor 111 can be configured to execute modules, functions and/or processes to update the distributed database instance 114 in response to receiving a synchronization event associated with a transaction from another compute device, a record associated with an order of synchronization events, and/or the like. In other embodiments, the processor 111 can be configured to execute modules, functions and/or processes to update the distributed database instance 114 in response to receiving a value for a parameter stored in another instance of the distributed database (e.g., distributed database instance 124 at compute device 120), and/or cause a value for a parameter stored in the distributed database instance 114 at compute device 110 to be sent to compute device 120. In some embodiments, the processor 111 can be a general purpose processor, a Field Programmable Gate Array (FPGA), an Application Specific Integrated Circuit (ASIC), a Digital Signal Processor (DSP), and/or the like.

The display 113 can be any suitable display, such as, for example, a liquid crystal display (LCD), a cathode ray tube display (CRT) or the like. In other embodiments, any of compute devices 110, 120, 130, 140 includes another output device instead of or in addition to the displays 113, 123, 133, 143. For example, any one of the compute devices 110, 120, 130, 140 can include an audio output device (e.g., a speaker), a tactile output device, and/or the like. In still other embodiments, any of compute devices 110, 120, 130, 140 includes an input device instead of or in addition to the displays 113, 123, 133, 143. For example, any one of the compute devices 110, 120, 130, 140 can include a keyboard, a mouse, and/or the like.

The compute device 120 has a processor 121, a memory 122, and a display 123, which can be structurally and/or functionally similar to the processor 111, the memory 112, and the display 113, respectively. Also, distributed database instance 124 can be structurally and/or functionally similar to distributed database instance 114.

The compute device 130 has a processor 131, a memory 132, and a display 133, which can be structurally and/or functionally similar to the processor 111, the memory 112, and the display 113, respectively. Also, distributed database instance 134 can be structurally and/or functionally similar to distributed database instance 114.

The compute device 140 has a processor 141, a memory 142, and a display 143, which can be structurally and/or functionally similar to the processor 111, the memory 112, and the display 113, respectively. Also, distributed database instance 144 can be structurally and/or functionally similar to distributed database instance 114.

Even though compute devices 110, 120, 130, 140 are shown as being similar to each other, each compute device of the distributed database system 100 can be different from the other compute devices. Each compute device 110, 120, 130, 140 of the distributed database system 100 can be any one of, for example, a computing entity (e.g., a personal computing device such as a desktop computer, a laptop computer, etc.), a mobile phone, a personal digital assistant (PDA), and so forth. For example, compute device 110 can be a desktop computer, compute device 120 can be a smartphone, and compute device 130 can be a server.

In some embodiments, one or more portions of the compute devices 110, 120, 130, 140 can include a hardware-based module (e.g., a digital signal processor (DSP), a field programmable gate array (FPGA)) and/or a software-based module (e.g., a module of computer code stored in memory and/or executed at a processor). In some embodiments, one or more of the functions associated with the compute devices 110, 120, 130, 140 (e.g., the functions associated with the processors 111, 121, 131, 141) can be included in one or more modules (see, e.g., FIG. 2).

The properties of the distributed database system 100, including the properties of the compute devices (e.g., the compute devices 110, 120, 130, 140), the number of compute devices, and the network 105, can be selected in any number of ways. In some instances, the properties of the distributed database system 100 can be selected by an administrator of distributed database system 100. In other instances, the properties of the distributed database system 100 can be collectively selected by the users of the distributed database system 100.

Because a distributed database system 100 is used, no leader is appointed among the compute devices 110, 120, 130, and 140. Specifically, none of the compute devices 110, 120, 130, or 140 are identified and/or selected as a leader to settle disputes between values stored in the distributed database instances 111, 12, 131, 141 of the compute devices 110, 120, 130, 140. Instead, using the event synchronization processes, the voting processes and/or methods described herein, the compute devices 110, 120, 130, 140 can collectively converge on a value for a parameter.

Not having a leader in a distributed database system increases the security of the distributed database system. Specifically, with a leader there is a single point of attack and/or failure. If malicious software infects the leader and/or a value for a parameter at the leader's distributed database instance is maliciously altered, the failure and/or incorrect value is propagated throughout the other distributed database instances. In a leaderless system, however, there is not a single point of attack and/or failure. Specifically, if a parameter in a distributed database instance of a leaderless system contains a value, the value will change after that distributed database instance exchanges values with the other distributed database instances in the system, as described in further detail herein. Additionally, the leaderless distributed database systems described herein increase the speed of convergence while reducing the amount of data sent between devices as described in further detail herein.

Figure 2:
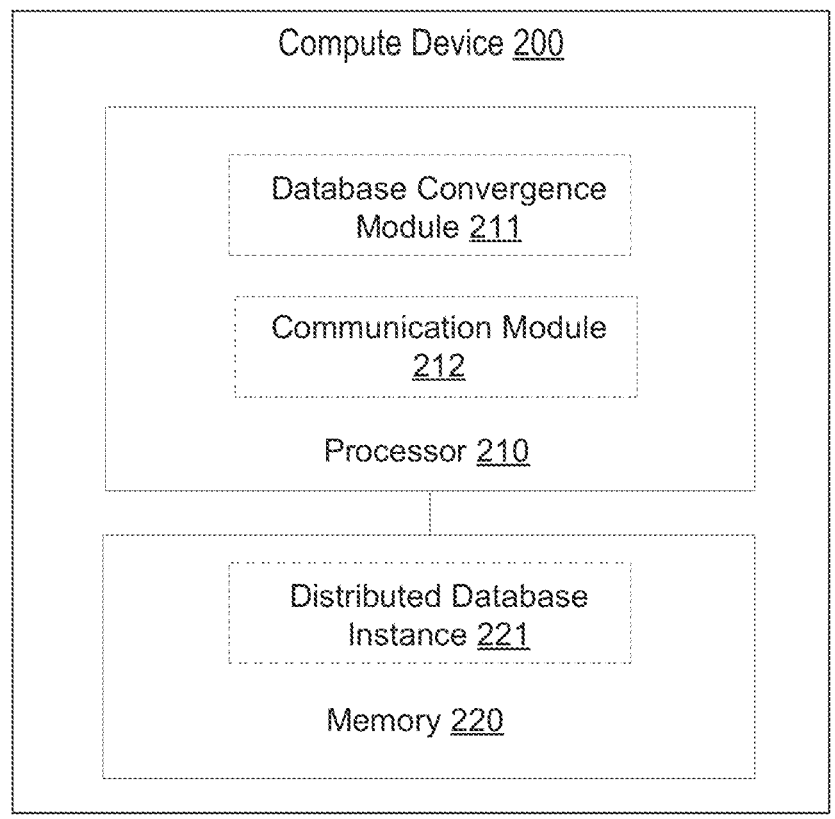
FIG. 2 is a block diagram that illustrates a compute device of a distributed database system, according to an embodiment.

FIG. 2 illustrates a compute device 200 of a distributed database system (e.g., distributed database system 100), according to an embodiment. In some embodiments, compute device 200 can be similar to compute devices 110, 120, 130, 140 shown and described with respect to FIG. 1. Compute device 200 includes a processor 210 and a memory 220. The processor 210 and memory 220 are operatively coupled to each other. In some embodiments, the processor 210 and memory 220 can be similar to the processor 111 and memory 112, respectively, described in detail with respect to FIG. 1. As shown in FIG. 2, the processor 210 includes a database convergence module 211 and communication module 210, and the memory 220 includes a distributed database instance 221. The communication module 212 enables compute device 200 to communicate with (e.g., send data to and/or receive data from) other compute devices. In some embodiments, the communication module 212 (not shown in FIG. 1) enables compute device 110 to communicate with compute devices 120, 130, 140. Communication module 210 can include and/or enable, for example, a network interface controller (NIC), wireless connection, a wired port, and/or the like. As such, the communication module 210 can establish and/or maintain a communication session between the compute device 200 and another device (e.g., via a network such as network 105 of FIG. 1 or the Internet (not shown)). Similarly stated, the communication module 210 can enable the compute device 200 to send data to and/or receive data from another device.

In some instances, the database convergence module 211 can exchange events and/or transactions with other computing devices, store events and/or transactions that the database convergence module 211 receives, and calculate an ordering of the events and/or transactions based on the partial order defined by the pattern of references between the events. Each event can be a record containing a cryptographic hash of two earlier events (linking that event to the two earlier events and their ancestor events, and vice versa), payload data (such as transactions that are to be recorded), other information such as the current time, a timestamp (e.g., date and UTC time) that its creator asserts is the time the event was first defined, and/or the like. In some instances, the first event defined by a member only includes a hash of a single event defined by another member. In such instances, the member does not yet have a prior self-hash (e.g., a hash of an event previously defined by that member). In some instances, the first event in a distributed database does not include a hash of any prior event (since there is no prior event for that distributed database).

In some embodiments, such a cryptographic hash of the two earlier events can be a hash value defined based on a cryptographic hash function using an event as an input. Specifically, in such embodiments, the event includes a particular sequence or string of bytes (that represent the information of that event). The hash of an event can be a value returned from a hash function using the sequence of bytes for that event as an input. In other embodiments, any other suitable data associated with the event (e.g., an identifier, serial number, the bytes representing a specific portion of the event, etc.) can be used as an input to the hash function to calculate the hash of that event. Any suitable hash function can be used to define the hash. In some embodiments, each member uses the same hash function such that the same hash is generated at each member for a given event. The event can then be digitally signed by the member defining and/or creating the event.

In some instances, the set of events and their interconnections can form a Directed Acyclic Graph (DAG). In some instances, each event in a DAG references two earlier events (linking that event to the two earlier events and their ancestor events and vice versa), and each reference is strictly to earlier ones, so that there are no loops. In some embodiments, the DAG is based on cryptographic hashes, so the data structure can be called a hashgraph (also referred to herein as a "hashDAG"). The hashgraph directly encodes a partial order, meaning that event X is known to come before event Y if Y contains a hash of X, or if Y contains a hash of an event that contains a hash of X, or for such paths of arbitrary length. If, however, there is no path from X to Y or from Y to X, then the partial order does not define which event came first. Therefore, the database convergence module can calculate a total order from the partial order. This can be done by any suitable deterministic function that is used by the compute devices, so that the compute devices calculate the same order. In some embodiments, each member can recalculate this order after each sync, and eventually these orders can converge so that a consensus emerges.

A consensus algorithm can be used to determine the order of events in a hashgraph and/or the order of transactions stored within the events. The order of transactions in turn can define a state of a database as a result of performing those transactions according to the order. The defined state of the database can be stored as a database state variable.

In some instances, the database convergence module can use the following function to calculate a total order from the partial order in the hashgraph. For each of the other compute devices (called "members"), the database convergence module can examine the hashgraph to discover an order in which the events (and/or indications of those events) were received by that member. The database convergence module can then calculate as if that member assigned a numeric "rank" to each event, with the rank being 1 for the first event that member received, 2 for the second event that member received, and so on. The database convergence module can do this for each member in the hashgraph. Then, for each event, the database convergence module can calculate the median of the assigned ranks, and can sort the events by their medians. The sort can break ties in a deterministic manner, such as sorting two tied events by a numeric order of their hashes, or by some other method, in which the database convergence module of each member uses the same method. The result of this sort is the total order.

Figure 6:
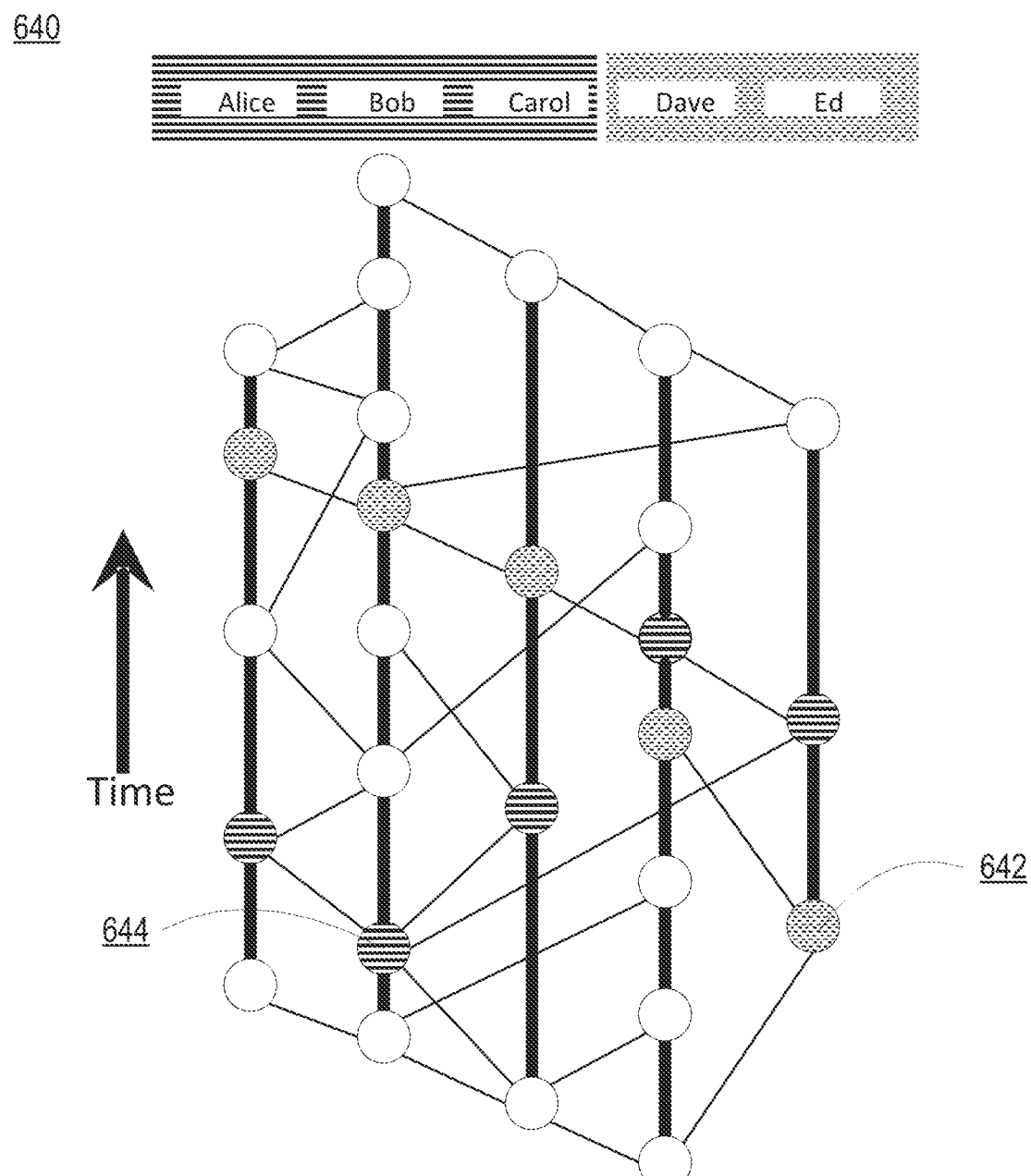

FIG. 6 illustrates a hashgraph 640 of one example for determining a total order. hashgraph 640 illustrates two events (the lowest striped circle and lowest dotted circle) and the first time each member receives an indication of those events (the other striped and dotted circles). Each member's name at the top is colored by which event is first in their slow order. There are more striped initial votes than dotted; therefore consensus votes for each of the members are striped. In other words, the members eventually converge to an agreement that the striped event occurred before the dotted event.

In this example, the members (compute devices labeled Alice, Bob, Carol, Dave and Ed) will work to define a consensus of whether event 642 or event 644 occurred first. Each striped circle indicates the event at which a member first received an event 644 (and/or an indication of that event 644). Similarly, each dotted circle indicates the event at which a member first received an event 642 (and/or an indication of that event 642). As shown in the hashgraph 640, Alice, Bob and Carol each received event 644 (and/or an indication of event 644) prior to event 642. Dave and Ed both received event 642 (and/or an indication of event 642) prior to event 644 (and/or an indication of event 644). Thus, because a greater number of members received event 644 prior to event 642, the total order can be determined by each member to indicate that event 644 occurred prior to event 642.

In other instances, the database convergence module can use a different function to calculate the total order from the partial order in the hashgraph. In such embodiments, for example, the database convergence module can use the following functions to calculate the total order, where a positive integer Q is a parameter shared by the members.

creator(x)=the member who created event x anc(x)=the set of events that are ancestors of x, including x itself other (x)=the event created by the member who synced just before x was created self (x)=the last event before x with the same creator self (x,0)=self (x)

self (x,n)=self (self (x),n−1)

order(x,y)=k, where y is the kth event that creator (x) learned of last(x)={y|y∈anc(x)^¬∃z∈anc(x), (y∈anc(z)∧creator(y)=^creator (z))}

$$slow(x, y) = \begin{cases} \infty & \text{if } y \notin anc(x) \\ order(x, y) & \text{if } y \in anc(x) \land y \notin anc(self(x)) \\ fast(x, y) & \text{if } \forall i \in \{1, \ldots, Q\}, fast(x, y) = fast(self(x, i), y) \\ slow(self(x), y) & \text{otherwise} \end{cases}$$

fast(x, y) = the position of y in a sorted list, with element $z \in anc(x)$ sorted by $\underset{w \in last(x)}{median}$ slow(w, z)

and with ties broken by the hash of each event

In this embodiment, fast(x,y) gives the position of y in the total order of the events, in the opinion of creator(x), substantially immediately after x is created and/or defined. If Q is infinity, then the above calculates the same total order as in the previously described embodiment. If Q is finite, and all members are online, then the above calculates the same total order as in the previously described embodiment. If Q is finite and a minority of the members is online at a given time, then this function allows the online members to reach a consensus among them that will remain unchanged as new members come online slowly, one by one. If, however, there is a partition of the network, then the members of each partition can come to their own consensus. Then, when the partition is healed, the members of the smaller partition will adopt the consensus of the larger partition.

Figure 8:
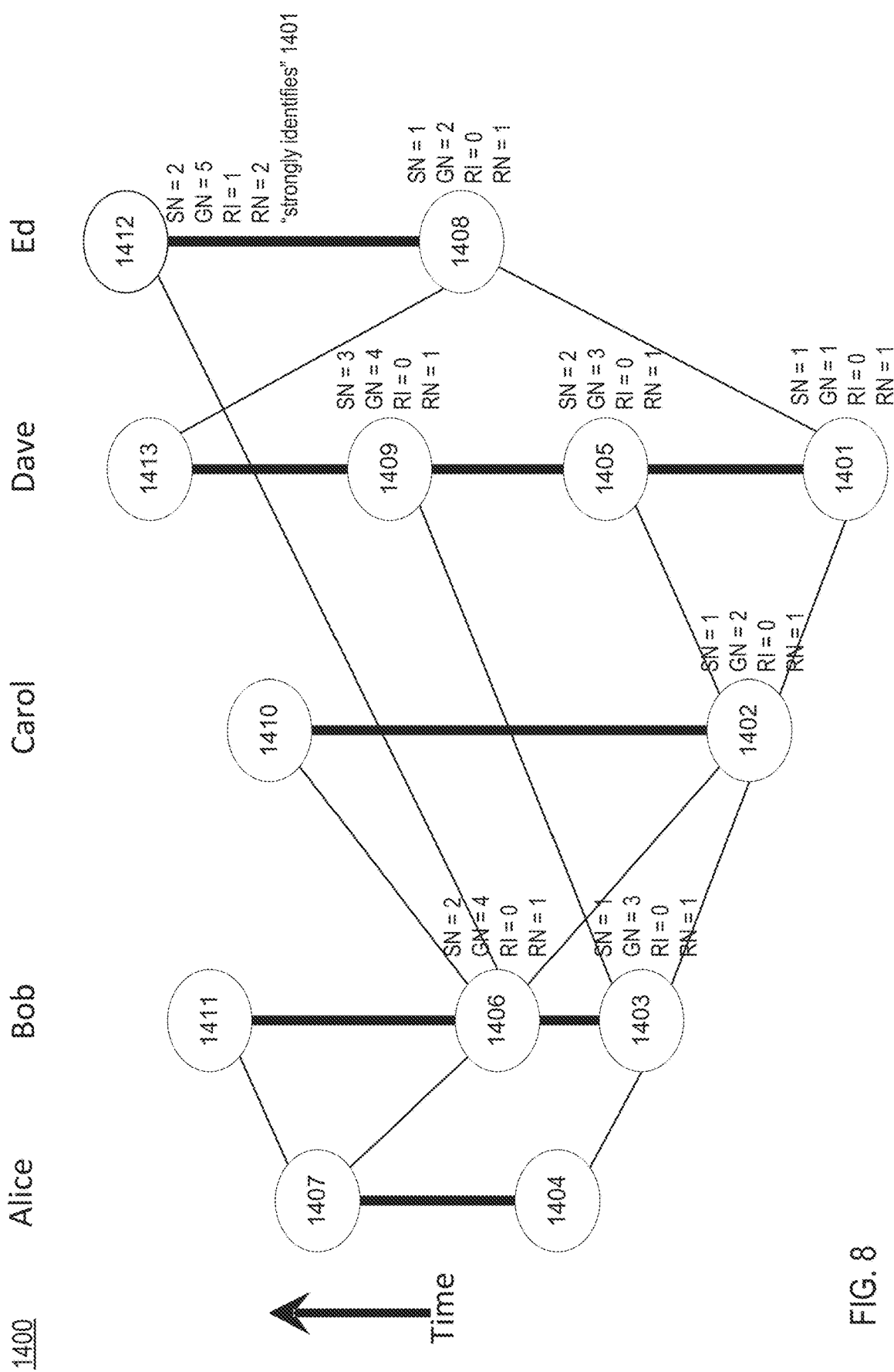
FIG. 8 is an example of a hashgraph, according to an embodiment.
Figure 9:
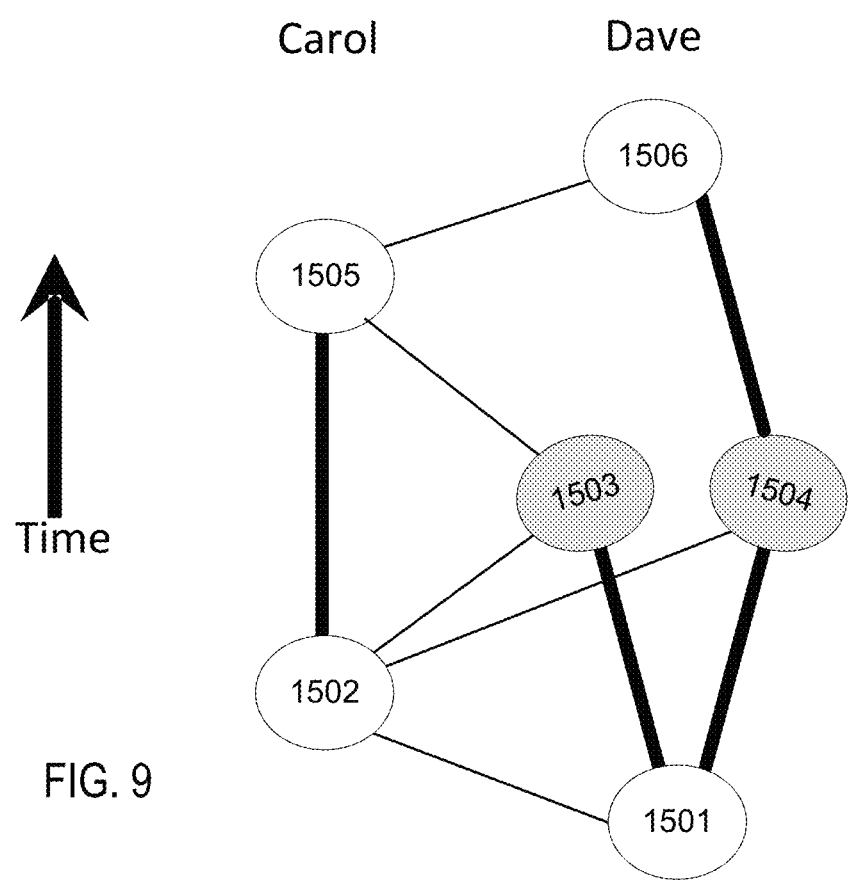
FIG. 9 is an example of a hashgraph, according to an embodiment.

In still other instances, as described with respect to FIGS. 8, 9 and 13A-14B, the database convergence module can use yet a different function to calculate the total order from the partial order in the hashgraph. As shown in FIGS. 8-9 each member (Alice, Bob, Carol, Dave and Ed) creates and/or defines events (1401-1413 as shown in FIG. 8; 1501-1506 shown in FIG. 9). Using the function and sub-functions described with respect to FIGS. 8, 9 and 13A-14B, the total order for the events can be calculated by sorting the events by their received round, breaking ties by their received timestamp, and breaking those ties by their signatures, as described in further detail herein. In other instances, the total order for the events can be calculated by sorting the events by their received round, breaking ties by their received generation (instead of their received timestamp), and breaking those ties by their signatures. The following paragraphs specify functions used to calculate and/or define an event's received round and received generation to determine an order for the events. The following terms are used and illustrated in connection with FIGS. 8, 9 and 13A-14B.

"Parent": an event X is a parent of event Y if Y contains a hash of X. For example, in FIG. 8, the parents of event 1412 include event 1406 and event 1408.

"Ancestor": the ancestors of an event X are X, its parents, its parents' parents, and so on. For example, in FIG. 8, the ancestors of event 1412 are events 1401, 1402, 1403, 1406, 1408, and 1412. Ancestors of an event can be said to be linked to that event and vice versa.

"Descendant": the descendants of an event X are X, its children, its children's children, and so on. For example, in FIG. 8, the descendants of event 1401 are every event shown in the figure. For another example, the descendants of event 1403 are events 1403, 1404, 1406, 1407, 1409, 1410, 1411, 1412 and 1413. Descendants of an event can be said to be linked to that event and vice versa.

"N": the total number of members in the population. For example, in FIG. 8, the members are compute devices labeled Alice, Bob, Carol, Dave and Ed, and N is equal to five.

"M": the least integer that is more than a certain percentage of N (e.g., more than ⅔ of N). For example, in FIG. 8, if the percentage is defined to be ⅔, then M is equal to four. In other instances, M could be defined, for example, to be a different percentage of N (e.g., ⅓, ½, etc.), a specific predefined number, and/or in any other suitable manner.

"Self-parent": the self-parent of an event X is its parent event Y created and/or defined by the same member. For example, in FIG. 8, the self-parent of event 1405 is 1401.

"Self-ancestor": the self-ancestors of an event X are X, its self-parent, its self-parent's self-parent, and so on.

"Sequence Number" (or "SN"): an integer attribute of an event, defined as the Sequence Number of the event's self-parent, plus one. For example, in FIG. 8, the self-parent of event 1405 is 1401. Since the Sequence Number of event 1401 is one, the Sequence Number of event 1405 is two (i.e., one plus one).

"Generation Number" (or "GN"): an integer attribute of an event, defined as the maximum of the Generation Numbers of the event's parents, plus one. For example, in FIG. 8, event 1412 has two parents, events 1406 and 1408, having Generation Numbers four and two, respectively. Thus, the Generation Number of event 1412 is five (i.e., four plus one).

"Round Increment" (or "RI"): an attribute of an event that can be either zero or one.

"Round Number" (or "RN"): an integer attribute of an event. In some instances, Round Number can be defined as the maximum of the Round Numbers of the event's parents, plus the event's Round Increment. For example, in FIG. 8, event 1412 has two parents, events 1406 and 1408, both having a Round Number of one. Event 1412 also has a Round Increment of one. Thus, the Round Number of event 1412 is two (i.e., one plus one). In other instances, an event can have a Round Number R if R is the minimum integer such that the event can strongly see (as described herein) at least M events defined and/or created by different members, which all have a round number R−1. If there is no such integer, the Round Number for an event can be a default value (e.g., 0, 1, etc.). In such instances, the Round Number for an event can be calculated without using a Round Increment. For example, in FIG. 8, if M is defined to be the least integer greater than ½ times N, then M is three. Then event 1412 strongly sees the M events 1401, 1402, and 1408, each of which was defined by a different member and has a Round Number of 1. The event 1412 cannot strongly see at least M events with Round Number of 2 that were defined by different members. Therefore, the Round Number for event 1412 is 2. In some instances, the first event in the distributed database includes a Round Number of 1. In other instances, the first event in the distributed database can include a Round Number of 0 or any other suitable number.

"Forking": an event X is a fork with event Y if they are defined and/or created by the same member, and neither is a self-ancestor of the other. For example, in FIG. 9, member Dave forks by creating and/or defining events 1503 and 1504, both having the same self-parent (i.e., event 1501), so that event 1503 is not a self-ancestor of event 1504, and event 1504 is not a self-ancestor of event 1503.

"Identification" of forking: forking can be "identified" by a third event created and/or defined after the two events that are forks with each other, if those two events are both ancestors of the third event. For example, in FIG. 9, member Dave forks by creating events 1503 and 1504, neither of which is a self-ancestor of the other. This forking can be identified by later event 1506 because events 1503 and 1504 are both ancestors of event 1506. In some instances, identification of forking can indicate that a particular member (e.g., Dave) has cheated.

"Identification" of an event: an event X "identifies" or "sees" an ancestor event Y if X has no ancestor event Z that is a fork with Y. For example, in FIG. 8, event 1412 identifies (also referred to as "sees") event 1403 because event 1403 is an ancestor of event 1412, and event 1412 has no ancestor events that are forks with event 1403. In some instances, event X can identify event Y if X does not identify forking prior to event Y. In such instances, even if event X identifies forking by the member defining event Y subsequent to event Y, event X can see event Y. Event X does not identify events by that member subsequent to forking. Moreover, if a member defines two different events that are both that member's first events in history, event X can identify forking and does not identify any event by that member.

"Strong identification" (also referred to herein as "strongly seeing") of an event: an event X "strongly identifies" (or "strongly sees") an ancestor event Y created and/or defined by the same member as X, if X identifies Y. Event X "strongly identifies" an ancestor event Y that is not created and/or defined by the same member as X, if there exists a set S of events that (1) includes both X and Y and (2) are ancestors of event X and (3) are descendants of ancestor event Y and (4) are identified by X and (5) can each identify Y and (6) are created and/or defined by at least M different members. For example, in FIG. 8, if M is defined to be the least integer that is more than ⅔ of N (i.e., M=1+floor(2N/3), which would be four in this example), then event 1412 strongly identifies ancestor event 1401 because the set of events 1401, 1402, 1406, and 1412 is a set of at least four events that are ancestors of event 1412 and descendants of event 1401, and they are created and/or defined by the four members Dave, Carol, Bob, and Ed, respectively, and event 1412 identifies each of events 1401, 1402, 1406, and 1412, and each of events 1401, 1402, 1406, and 1412 identifies event 1401. Similarly stated, an event X (e.g., event 1412) can "strongly see" event Y (e.g., event 1401) if X can see at least M events (e.g., events 1401, 1402, 1406, and 1412) created or defined by different members, each of which can see Y.

"Round R first" event (also referred to herein as a "witness"): an event is a "round R first" event (or a "witness") if the event (1) has Round Number R, and (2) has a self-parent having a Round Number smaller than R or has no self-parent. For example, in FIG. 8, event 1412 is a "round 2 first" event because it has a Round Number of two, and its self-parent is event 1408, which has a Round Number of one (i.e., smaller than two).

In some instances, the Round Increment for an event X is defined to be 1 if and only if X "strongly identifies" at least M "round R first" events, where R is the maximum Round Number of its parents. For example, in FIG. 8, if M is defined to be the least integer greater than ½ times N, then M is three. Then event 1412 strongly identifies the M events 1401, 1402, and 1408, all of which are round 1 first events.

Both parents of 1412 are round 1, and 1412 strongly identifies at least M round 1 firsts, therefore the round increment for 1412 is one. The events in the diagram marked with "RI=0" each fail to strongly identify at least M round 1 firsts, therefore their round increments are 0.

In some instances, the following method can be used for determining whether event X can strongly identify ancestor event Y. For each round R first ancestor event Y, maintain an array A1 of integers, one per member, giving the lowest sequence number of the event X, where that member created and/or defined event X, and X can identify Y. For each event Z, maintain an array A2 of integers, one per member, giving the highest sequence number of an event W created and/or defined by that member, such that Z can identify W. To determine whether Z can strongly identify ancestor event Y, count the number of element positions E such that A1[E] <=A2[E]. Event Z can strongly identify Y if and only if this count is greater than M. For example, in FIG. 8, members Alice, Bob, Carol, Dave and Ed can each identify event 1401, where the earliest event that can do so is their events {1404, 1403, 1402, 1401, 1408}, respectively. These events have sequence numbers A1={1,1,1,1,1}. Similarly, the latest event by each of them that is identified by event 1412 is event {NONE, 1406, 1402, 1401, 1412}, where Alice is listed as "NONE" because 1412 cannot identify any events by Alice. These events have sequence numbers of A2={0, 2,1,1,2}, respectively, where all events have positive sequence numbers, so the 0 means that Alice has no events that are identified by 1412. Comparing the list A1 to the list A2 gives the results {1<–0, 1<–2, 1<–1, 1<–1, 1<–2} which is equivalent to {false, true, true, true, true} which has four values that are true. Therefore, there exists a set S of four events that are ancestors of 1412 and descendants of 1401. Four is at least M, therefore 1412 strongly identifies 1401.

Yet another variation on implementing the method for determining, with A1 and A2, whether event X can strongly identify ancestor event Y is as follows. If the integer elements in both arrays are less than 128, then it is possible to store each element in a single byte, and pack 8 such elements into a single 64-bit word, and let A1 and A2 be arrays of such words. The most significant bit of each byte in A1 can be set to 0, and the most significant bit of each byte in A2 can be set to 1. Subtract the two corresponding words, then perform a bitwise AND with a mask to zero everything but the most significant bits, then right shift by 7 bit positions, to get a value that is expressed in the C programming language as: ((A2[i]–A1[i]) & 0x8080808080808080) >>7). This can be added to a running accumulator S that was initialized to zero. After doing this multiple times, convert the accumulator to a count by shifting and adding the bytes, to get ((S & 0xff)+((S>>8) & 0xff)+((S>>16) & 0xff)+ ((S>>24) & 0xff)+((S>>32) & 0xff)+((S>>40) & 0xff)+ ((S>>48) & 0xff)+((S>> 56) & 0xff)). In some instances, these calculations can be performed in programming languages such as C, Java, and/or the like. In other instances, the calculations can be performed using processor-specific instructions such as the Advanced Vector Extensions (AVX) instructions provided by Intel and AMD, or the equivalent in a graphics processing unit (GPU) or general-purpose graphics processing unit (GPGPU). On some architectures, the calculations can be performed faster by using words larger than 64 bits, such as 128, 256, 512, or more bits.

"Famous" event: a round R event X is "famous" if (1) the event X is a "round R first" event (or "witness") and (2) a decision of "YES" is reached via execution of a Byzantine agreement protocol, described below. In some embodiments, the Byzantine agreement protocol can be executed by an instance of a distributed database (e.g., distributed database instance 114) and/or a database convergence module (e.g., database convergence module 211). For example, in FIG. 8, there are five round 1 firsts shown: 1401, 1402, 1403, 1404, and 1408. If M is defined to be the least integer greater than ½ times N, which is three, then 1412 is a round 2 first. If the protocol runs longer, then the hashgraph will grow upward, and eventually the other four members will also have round 2 firsts above the top of this figure. Each round 2 first will have a "vote" on whether each of the round 1 firsts is "famous". Event 1412 would vote YES for 1401, 1402, and 1403 being famous, because those are round 1 firsts that it can identify. Event 1412 would vote NO for 1404 being famous, because 1412 cannot identify 1404. For a given round 1 first, such as 1402, its status of being "famous" or not will be decided by calculating the votes of each round 2 first for whether it is famous or not. Those votes will then propagate to round 3 firsts, then to round 4 firsts and so on, until eventually agreement is reached on whether 1402 was famous. The same process is repeated for other firsts.

A Byzantine agreement protocol can collect and use the votes and/or decisions of "round R first" events to identify "famous events. For example, a "round R+1 first" Y will vote "YES" if Y can "identify" event X, otherwise it votes "NO." Votes are then calculated for each round G, for G=R+2, R+3, R+4, etc., until a decision is reached by any member. Until a decision has been reached, a vote is calculated for each round G. Some of those rounds can be "majority" rounds, while some other rounds can be "coin" rounds. In some instances, for example, Round R+2 is a majority round, and future rounds are designated as either a majority or a coin round (e.g., according to a predefined schedule). For example, in some instances, whether a future round is a majority round or a coin round can be arbitrarily determined, subject to the condition that there cannot be two consecutive coin rounds. For example, it might be predefined that there will be five majority rounds, then one coin round, then five majority rounds, then one coin round, repeated for as long as it takes to reach agreement.

In some instances, if round G is a majority round, the votes can be calculated as follows. If there exists a round G event that strongly identifies at least M round G–1 firsts voting V (where V is either "YES" or "NO"), then the consensus decision is V, and the Byzantine agreement protocol ends. Otherwise, each round G first event calculates a new vote that is the majority of the round G–1 firsts that each round G first event can strongly identify. In instances where there is a tie rather than majority, the vote can be designated "YES."

Similarly stated, if X is a round R witness (or round R first), then the results of votes in rounds R+1, R+2, and so on can be calculated, where the witnesses in each round are voting for whether X is famous. In round R+1, every witness that can see X votes YES, and the other witnesses vote NO. In round R+2, every witness votes according to the majority of votes of the round R+1 witnesses that it can strongly see. Similarly, in round R+3, every witness votes according to the majority of votes of the round R+2 witness that it can strongly see. This can continue for multiple rounds. In case of a tie, the vote can be set to YES. In other instances, the tie can be set to NO or can be randomly set. If any round has at least M of the witnesses voting NO, then the election ends, and X is not famous. If any round has at least M of the witnesses voting YES, then the election ends, and X is famous. If neither YES nor NO has at least M votes, the election continues to the next round.

As an example, in FIG. 8, consider some round first event X that is below the figure shown. Then, each round 1 first will have a vote on whether X is famous. Event 1412 can strongly identify the round 1 first events 1401, 1402, and 1408. So its vote will be based on their votes. If this is a majority round, then 1412 will check whether at least M of {1401, 1402, 1408} have a vote of YES. If they do, then the decision is YES, and the agreement has been achieved. If at least M of them votes NO, then the decision is NO, and the agreement has been achieved. If the vote doesn't have at least M either direction, then 1412 is given a vote that is a majority of the votes of those of 1401, 1402, and 1408 (and would break ties by voting YES, if there were a tie). That vote would then be used in the next round, continuing until agreement is reached.

In some instances, if round G is a coin round, the votes can be calculated as follows. If event X can identify at least M round G−1 firsts voting V (where V is either "YES" or "NO"), then event X will change its vote to V. Otherwise, if round G is a coin round, then each round G first event X changes its vote to the result of a pseudo-random determination (akin to a coin flip in some instances), which is defined to be the least significant bit of the signature of event X.

Similarly stated, in such instances, if the election reaches a round R+K (a coin round), where K is a designated factor (e.g., a multiple of a number such as 3, 6, 7, 8, 16, 32 or any other suitable number), then the election does not end on that round. If the election reaches this round, it can continue for at least one more round. In such a round, if event Y is a round R+K witness, then if it can strongly see at least M witnesses from round R+K−1 that are voting V, then Y will vote V. Otherwise, Y will vote according to a random value (e.g., according to a bit of the signature of event Y (e.g., least significant bit, most significant bit, randomly selected bit) where 1=YES and 0=NO, or vice versa, according to a time stamp of the event Y, using a cryptographic "shared coin" protocol and/or any other random determination). This random determination is unpredictable before Y is created, and thus can increase the security of the events and consensus protocol.

For example, in FIG. 8, if round 2 is a coin round, and the vote is on whether some event before round 1 was famous, then event 1412 will first check whether at least M of {1401, 1402, 1408} voted YES, or at least M of them voted NO. If that is the case, then 1412 will vote the same way. If there are not at least M voting in either direction, then 1412 will have a random or pseudorandom vote (e.g., based on the least significant bit of the digital signature that Ed created for event 1412 when he signed it, at the time he created and/or defined it).

In some instances, the result of the pseudo-random determination can be the result of a cryptographic shared coin protocol, which can, for example, be implemented as the least significant bit of a threshold signature of the round number.

A system can be built from any one of the methods for calculating the result of the pseudo-random determination described above. In some instances, the system cycles through the different methods in some order. In other instances, the system can choose among the different methods according to a predefined pattern.

"Received round": An event X has a "received round" of R if R is the minimum integer such that at least half of the famous round R first events (or famous witnesses) with round number R are descendants of and/or can see X. In other instances, any other suitable percentage can be used.

For example, in another instance, an event X has a "received round" of R if R is the minimum integer such that at least a predetermined percentage (e.g., 40%, 60%, 80%, etc.) of the famous round R first events (or famous witnesses) with round number R are descendants of and/or can see X.

In some instances, the "received generation" of event X can be calculated as follows. Find which member created and/or defined each round R first event that can identify event X. Then determine the generation number for the earliest event by that member that can identify X. Then define the "received generation" of X to be the median of that list.

In some instances, a "received timestamp" T of an event X can be the median of the timestamps in the events that include the first event by each member that identifies and/or sees X. For example, the received timestamp of event 1401 can be the median of the value of the timestamps for events 1402, 1403, 1403, and 1408. In some instances, the timestamp for event 1401 can be included in the median calculation. In other instances, the received timestamp for X can be any other value or combination of the values of the timestamps in the events that are the first events by each member to identify or see X. For example, the received timestamp for X can be based on an average of the timestamps, a standard deviation of the timestamps, a modified average (e.g., by removing the earliest and latest timestamps from the calculation), and/or the like. In still other instances, an extended median can be used.

In some instances, the total order and/or consensus order for the events is calculated by sorting the events by their received round, breaking ties by their received timestamp, and breaking those ties by their signatures. In other instances, the total order for the events can be calculated by sorting the events by their received round, breaking ties by their received generation, and breaking those ties by their signatures. The foregoing paragraphs specify functions used to calculate and/or define an event's received round, received timestamp, and/or received generation.

In other instances, instead of using the signature of each event, the signature of that event XORed with the signatures of the famous events or famous witnesses with the same received round and/or received generation in that round can be used. In other instances, any other suitable combination of event signatures can be used to break ties to define the consensus order of events.

In still other instances, instead of defining the "received generation" as the median of a list, the "received generation" can be defined to be the list itself. Then, when sorting by received generation, two received generations can be compared by the middle elements of their lists, breaking ties by the element immediately before the middle, breaking those ties by the element immediately after the middle, and continuing by alternating between the element before those used so far and the element after, until the tie is broken.

In some instances, the median timestamp can be replaced with an "extended median." In such instances, a list of timestamps can be defined for each event rather than a single received timestamp. The list of timestamps for an event X can include the first event by each member that identifies and/or sees X. For example, in FIG. 8, the list of timestamps for event 1401 can include the timestamps for events 1402, 1403, 1403, and 1408. In some instances, the timestamp for event 1401 can also be included. When breaking a tie with the list of timestamps (i.e., two events have the same received round), the middle timestamps of each event's list (or a predetermined of the first or second of the two middle timestamps, if of even length) can be compared. If these timestamps are the same, the timestamps immediately after the middle timestamps can be compared. If these timestamps are the same, the timestamps immediately preceding the middle timestamps can be compared. If these timestamps are also the same, the timestamps after the three already compared timestamps are compared. This can continue to alternate until the tie is broken. Similar to the above discussion, if the two lists are identical, the tie can be broken by the signatures of the two elements.

In still other instances, a "truncated extended median" can be used instead of an "extended median." In such an instance, an entire list of timestamps is not stored for each event. Instead, only a few of the values near the middle of the list are stored and used for comparison.

The median timestamp received can potentially be used for other purposes in addition to calculating a total order of events. For example, Bob might sign a contract that says he agrees to be bound by the contract if and only if there is an event X containing a transaction where Alice signs that same contract, with the received timestamp for X being on or before a certain deadline. In that case, Bob would not be bound by the contract if Alice signs it after the deadline, as indicated by the "received median timestamp", as described above.

In some instances, a state of the distributed database can be defined after a consensus is achieved. For example, if S(R) is the set of events that can be seen by the famous witnesses in round R, eventually all of the events in S(R) will have a known received round and received timestamp. At that point, the consensus order for the events in S(R) is known and will not change. Once this point is reached, a member can calculate and/or define a representation of the events and their order. For example, a member can calculate a hash value of the events in S(R) in their consensus order. The member can then digitally sign the hash value and include the hash value in the next event that member defines. This can be used to inform the other members that that member has determined that the events in S(R) have the given order that will not change. After at least M of the members (or any other suitable number or percentage of members) have signed the hash value for S(R) (and thus agreed with the order represented by the hash value), that consensus list of events along with the list of signatures of the members can form a single file (or other data structure) that can be used to prove that the consensus order was as claimed for the events in S(R). In other instances, if events contain transactions that update a state of the distributed database system (as described herein), then the hash value can be of the state of the distributed database system after applying the transactions of the events in S(R) in the consensus order.

In some instances, M (as described above) can be based on weight values assigned to each member, rather than just a fraction, percentage and/or value of the number of total members. In such an instance, each member has a stake associated with its interest and/or influence in the distributed database system. Such a stake can be a weight value. Each event defined by that member can be said to have the weight value of its defining member. M can then be a fraction of the total stake of all members. The events described above as being dependent on M will occur when a set of members with a stake sum of at least M agree. Thus, based on their stake, certain members can have a greater influence on the system and how the consensus order is derived. In some instances, a transaction in an event can change the stake of one or more members, add new members, and/or delete members. If such a transaction has a received round of R, then after the received round has been calculated, the events after the round R witnesses will recalculate their round numbers and other information using the modified stakes and modified list of members. The votes on whether round R events are famous will use the old stakes and member list, but the votes on the rounds after R will use the new stakes and member list. Additional details regarding using weight values to determine consensus are described in U.S. patent application Ser. No. 15/387,048, filed Dec. 21, 2016 and titled "Methods And Apparatus For A Distributed Database With Consensus Determined Based On Weighted Stakes," which is incorporated herein by reference in its entirety.

In FIG. 2, the database convergence module 211 and the communication module 212 are shown as being implemented in processor 210. In other embodiments, the database convergence module 211 and/or the communication module 212 can be implemented in memory 220. In still other embodiments, the database convergence module 211 and/or the communication module 212 can be hardware based (e.g., ASIC, FPGA, etc.).

In some instances, a distributed database (e.g., shown and described with respect to FIG. 1) can allow the handling of "proxy transactions". In some instances, such proxy transactions can be performed by a member of the distributed database (e.g., a compute device having an instance of at least a portion of the distributed database) on behalf of a non-member of the distributed database (e.g., a compute device not having an instance of the distributed database), a member of the distributed database with less than full rights (e.g., has read but not write rights, does not factor into consensus decisions, etc.), and/or the like. For example, suppose Alice would like to submit a transaction TR to the distributed database, but she is not a full member of the distributed database (e.g., Alice is not a member or has limited rights). Suppose that Bob is a full member and has full rights in the distributed database. In that case, Alice can send transaction TR to Bob, and Bob can submit TR to the network to affect the distributed database. In some instances, Alice can digitally sign TR. In some instances, TR can include, for example, a payment to Bob (e.g., a fee for his service of submitting TR to the distributed database). In some instances, Alice can communicate TR to Bob over an anonymizing network, such as the TOR onion routing network, so that neither Bob nor other observers will be able to determine that TR came from Alice.

In some instances, a distributed database (e.g., shown and described with respect to FIG. 1) can be used to implement a cryptocurrency. In such an instance, each distributed database instance 114, 124, 134, 144 can define one or more wallet data structures (also referred to herein as wallets) to store cryptocurrency. The wallet data structure can include a key pair (a public key and a private key). In some instances, the key pair for a wallet can be generated by the compute device at which that wallet originates. For example, if Alice defines a wallet (W, K), with W being the public key (which can also act as an identifier for the wallet) and K being the private key, she can publish W (e.g., in an event) to the remaining instances of the distributed database, but keep her identity anonymous, so that the other instances of the distributed database (or their users) cannot identify that wallet W is associated with Alice. In some instances, however, cryptocurrency transfers are public. Thus, if her employer transfers money into W (e.g., using a transaction within an event), and later Alice makes a purchase by transferring money from W to a store (e.g., using a different transaction within a different event), then the employer and the store can collude to determine that W belongs to Alice, and that it was Alice who made the purchase. Thus, to avoid this, it can be beneficial for Alice to transfer the money to a new, anonymous wallet, to keep her transactions anonymous.

In some implementations, a WALLET_ADD operation can be used to store a pair (W, D) in the distributed database, and WALLET_DEL can be used to delete a wallet. In some instances, a user can add a wallet to the distributed database by paying a fee and such wallet can remain active in the distributed database for a time covered by the paid fee. The parameter W in the pair (W, D) corresponds to a wallet's public key and the parameter D is a data structure that can include a list of public keys, each of which corresponds to a private key, where any of such private keys can be used to, for example, sign a WALLET_DEL operation. In other instances, any sufficiently large set of such private keys can be used to sign a WALLET_DEL operation. For example, in such instances, a number of such private keys signing the WALLET_DEL must be above a predetermined threshold.

In other implementations, WALLET_ADD (W, D) can be an operation or function to add and/or bind a digital certificate to a public key W. A digital certificate is an electronic credential that binds a user, computer, or service's identity to a public key by providing information about the subject of the certificate, and applications and services that can use the certificate. Thus, in some instances, the data structure D can include a public key certificate (e.g., an X.509 certificate) of W, and a list of public keys that are permitted to unbind the certificate from the public key W. The public keys in such a list, can contain both W and the keys in the chain of the public key certificate.

A member, for example Alice, can create and/or define a new wallet via a WALLET_ADD (W, D) operation. Such a wallet includes a public key W. By default, a newly created wallet is anonymous because there is nothing in the wallet that links the wallet to member Alice (i.e., the compute device represented as Alice). The distributed database also enables members to create non-anonymous wallets to, for example, prevent money laundering operations, tax evasion, comply with Know Your Customer (KYC) laws or other suitable policies and practices. Thus, Alice and other members of the distributed database can: (1) use a trusted Certificate Authority (CA) to verify the member's identity (e.g., Alice identity) and obtain a certificate (e.g., X.509 certificate) binding the member to the wallet W and/or (2) use a trusted Identity Escrow Authority (IEA) to verify a member's identity (e.g., Alice), execute a blinded signature of an Identity Escrow File (IEF) created by such a member, and obtain a certificate (e.g., X.059 certificate) for the IEA's signing key.

In some instances, members of the distributed database can attach, for example, a certificate D created by a CA or an IEF to a wallet using the operation WALLET_ADD (A, D) and eventually delete such certificate using the operation WALLET_DEL (A, D). In such a case, a certificate chain can extend up to the CA or IEA that issued the certificate and/or can further extend to the entity approving the CA or IEA to be used in the distributed database, for example, to a government agency or other suitable institution.

In some instances when transactions executed through the distributed database have to comply with KYC laws or policies, then transactions between wallets, bank accounts, and/or private sellers of good and services can be executed after verification of a certificate issued by a CA. In such a case, the certificate chain can extend to an agency (e.g., government agency) that approved the CA. Thus, such transactions can be traced by the agency. In some instances, a user can bind a certificate to a wallet by paying a fee and such wallet can remain active in the distributed database for a time covered by the paid fee.

In some instances, transactions executed through the distributed database can comply with KYC and privacy laws or policies. In such instances, for example, transactions and private sellers of goods and services can be executed after verification of a certificate issued by an IEA. In such a case, the certificate chain can extend to the agency that approved the IEA. For example, an IEF can include W and a user's name and address, encrypted with a public key owned by the agency that approved the IEA. Thus, such an agency can decrypt the fields corresponding W and the user's name and address and identify the owner of the wallet. The user's identity, however, is not accessible to other members and/or users of the distributed database or other agencies.

In some instances, for example, a member can create and/or define a number of random wallets (e.g., 100 random wallets) and send blinded versions of their corresponding identity escrow files (e.g., 100 files) to the IEA, and then send information to the IEA to unblind and decrypt a subset of those files (e.g., 99 files) chosen at random by the IEA. Such a member can discard the 99 wallets associated with the 99 files and receive from the IEA a blind signature for the remaining identity escrow file. The member can then unblind the remaining identity escrow file and attach it to the remaining wallet. Thus, the IEA can vouch that such a member is attaching the escrowed identity to the remaining wallet. Thus the member can have privacy from the IEA, and only the agency approving the IEA can have access to the escrowed information.

In some instances, when, for example, a country or other institution has a privacy legal framework, the system can be further enhanced such that, instead of having a single key for decrypting identity escrow files, the government or other institution can have several agencies that cooperate to decrypt a member's identity (e.g., each agency and/or institution having a portion of a key that is combined with the other portions of the key to decrypt the identity escrow file). Accordingly, an agreement or cooperative operations can be made among multiple agencies to disclose a member's identity. Thus, the distributed database serves as a tool that can equally provide a balanced trade-off between privacy of the members or users of the distributed database and transparency of the transactions executed via the distributed database. Moreover, dividing a single key to decrypt identity escrow files enhances security and privacy of the compute devices implementing the distributed database.

The following example assumes that C coins of cryptocurrency are transferred from wallet W to wallet R if the following transaction is published (e.g., in an event), where the _K at the end means that the transaction is digitally signed with private key K. The following notation can be used:

TRANSFER(C, W, R)_K

In some instances, to achieve anonymity in a transfer of cryptocurrency, a new transaction type and/or distributed database function can be defined. For example, the following transactions will move C1 coins from wallet W1 to wallet R1, and also move C2 coins from wallet W2 to wallet R2. In some instances, for example, wallets W1 and R1 can be associated with a first instance of a distributed database and wallets W2 and R2 can be associated with a second instance of the distributed database, as described in further detail herein. In some instances, the transactions can include an arbitrary identifier N (e.g., a conversation identifier and/or a process identifier), which serves to connect them.

TRANSFER_DOUBLE(N, C1, W1, R1, C2, W2, R2, T)_K1
TRANSFER_DOUBLE(N, C1, W1, R1, C2, W2, R2, T)_K2

In some instances, these transactions have no effect unless two identical copies are published and distributed to other instances of the distributed database (e.g., in one or more events), one signed by K1 (using the private key associated with public key W1), and the other signed by K2 (using the private key associated with public key W2). In some instances, each transaction can also include a secure timestamp, as described above. This secure timestamp can be the secure timestamp of the event with which the transaction is associated or a separate secure timestamp of the transaction. If both of the transactions are published with timestamps within T seconds of each other (e.g., the secure timestamp of the transactions are within a predetermined time period of each other), then both currency transfers occur. Otherwise, neither transfer occurs.

In other instances, T is not used and the currency transfer occurs only if both transactions occur before either party posts a transaction canceling the transfer. For example, Alice can publish her signed transaction (e.g., her TRANSFER_DOUBLE transaction), then publish another signed transaction containing a cancel message for that first transaction, then Bob publishes his signed transaction. The transfer will not occur if Bob's transaction is later than Alice's cancel message, but the transfer will occur if Bob's transaction is earlier than Alice's cancel message. In this way, the system can work without T and without timestamps, using the consensus ordering of the transactions. In other instances, both T and cancel messages can be supported.

The following example illustrates how the "TRANSFER_DOUBLE" transaction type and/or distributed database function can be used to anonymously and securely initiate a transfer of data (such as currency). In the following example, Alice has a wallet W1 to which her employer transferred money. She wants to transfer C coins from W1 to an anonymous wallet W2 that she creates, which will later be used for purchases. But she wants secure anonymity, so that no one looking at the transactions will know that W1 is associated with the anonymous wallet W2. It should be secure, even if her employer colludes with a store to attack the anonymity. In addition, for example, Bob wants the same secure anonymity when transferring coins from his wallet W3 to an anonymous wallet W4 that he creates.

Alice and Bob can achieve a form of anonymity by executing the following protocol. It can involve any form of contacting each outer such as emailing each other directly, messaging each other through a chat site or through an online forum site, or through transactions published in the same public ledger that hosts the cryptocurrency (e.g., within events). The following example assumes that the protocol is executed via the public ledger. Assume Alice and Bob are initially strangers, but both have the ability to publish transactions to the public ledger and can read transactions that others publish to the public ledger. Alice and Bob can publish the following transactions to the public ledger (e.g., within one or more events):

Alice publishes: Anonymize1(N, C, W1)_K1
Bob calculates: B=encrypt(W4, W1)
Bob publishes: Anonymize2(N, W3, B)_K3
Alice calculates: A=encrypt(W2, W3)
Alice publishes: Anonymize3(N, A)_K1
Both calculate: MIN=min(W2, W4)
Both calculate: MAX=max(W2, W4)

Bob publishes: TRANSFER_DOUBLE(N, C, W1, MIN, C, W3, MAX, T)_K3
Alice publishes: TRANSFER_DOUBLE(N, C, W1, MIN, C, W3, MAX, T)_K1

In this example, Alice would like to transfer C coins from wallet W1 to W2, and Bob would like to transfer C coins from wallet W3 to W4. Each of Alice and Bob generates their own wallets by generating a (public key, private key) key pair for each wallet. Here, the public key for a wallet is also used as the name of the wallet (in other instances a separate identifier can be used to identify the wallet). Alice and Bob want to accomplish these transfers in such a way that observers can identify that the owner of wallet W1 is also the owner of either W2 or W4, but cannot identify which one. Similarly, Alice and Bob want to accomplish these transfers in such a way that observers can identify that the owner of wallet W3 is also the owner of either W2 or W4, but cannot identify which one. The wallet with public key W1 has private key K1. Similarly, wallets W2, W3, and W4 have private keys K2, K3, and K4, respectively. Each transaction or instruction above is signed with the private key listed at the end. For example, the initial transaction or instruction is digitally signed with private key K1.

The first transaction (Anonymize1(N, C, W1)_K1) is used to announce that Alice would like to transfer C coins from W1 to an anonymous wallet. This transaction includes an identifier number N, which can be a hash of the transaction, a random number included in the transaction, and/or any other suitable identifier. This N (e.g., a conversation identifier and/or process identifier) can be used in subsequent transactions to refer back to the transaction that initiated the process, to avoid confusion (and be able to identify the process or conversation) if there are several similar processes and/or conversations occurring at once. In some instances, N can include a timeout deadline (e.g., T), after which transactions including N are ignored. This transaction is digitally signed by K1.

The function encrypt(W4, W1) encrypts W4 (a public key of a wallet owned and defined by Bob as his target anonymous wallet) using the public key W1, giving a result B that can only be decrypted with the corresponding private key K1 (held by Alice). This ensures that none of the other instances of the distributed database viewing the transaction will be able to identify W4, except for the owner of W1 (Alice in this example).

The transaction Anonymize2(N, W3, B)_K3 indicates that as part of the process or conversation N, Bob would like to transfer C coins from W3 to an anonymous wallet identified by B. This transaction is digitally signed using private key K3. Alice can then decrypt B using private key K1 to identify Bob's target anonymous wallet as W4.

Alice can perform the function encrypt(W2, W3). This encrypts W2 (a public key of a wallet owned and defined by Alice as her target anonymous wallet) with public key W3 (Bob's initial wallet). Alice can then publish the transaction Anonymize3(N, A)_K1. Bob can identify W2 as Alice's target anonymous wallet by decrypting A with private key K3.

The function min(W2, W4) returns whichever of the two public keys W3 and W4 is first lexicographically (alphabetically). The function max(W2, W4) returns whichever of the two public keys W3 and W4 is last lexicographically (alphabetically). Thus, MIN can be either W2 or W4 and MAX can be W2 or W4. The min and max functions allow for an ordering of the wallets W2 and W4, that both Alice and Bob can identify, but that others cannot identify. In other instances, any other deterministic function can be used to identify to Alice and Bob how to order the anonymous wallets W2 and W4 such as a hash function, a ranking, and/or the like.

The TRANSFER_DOUBLE transactions can be published by both Bob and Alice and signed by their respective digital signatures, K1 and K3. Because both Bob and Alice are transferring the same number of coins C to each of their respective anonymous wallets, it does not matter which source wallet W1 or W3 transfers the coins to which destination wallet W2 or W4. Thus, in some instances, Alice transfers C coins to her own anonymous wallet and Bob transfers C coins to his own anonymous wallet. In other instances, Alice transfers C coins to Bob's anonymous wallet and Bob transfers C coins to Alice's anonymous wallet. This is determined by the MIN and MAX functions. This also ensures that observers can identify both W2 and W4, but will not be able to identify which wallet was defined by the owner of W1, and which wallet was defined by the owner of W3. After the transactions have been published, an observer knows that the owners of wallets W1 and W3 are collaborating to transfer C coins each to wallets W2 and W4, but the observer will not know which sender owns which receiving wallet, and so the wallets W2 and W4 will be slightly more anonymous than wallets W1 and W3.

In some instances, the transactions can be "proxy transactions", which means that a node in the network submits the transactions on behalf of another party. In the above example, Alice owns wallets W1 and W2, and would like to publish several transactions. If Carol is a member of the distributed database having full rights, then Alice can send the transactions to Carol to submit to the distributed database on Alice's behalf. In some instances, the proxy transaction can include an authorization to transfer a small fee from wallet W1 to Carol, to pay for that service. In some instances, Alice can communicate with Carol over a network that anonymizes communication, such as, for example, the TOR onion routing network.

In some instances, Alice can then repeat the above-described anonymity protocol with Dave, and Bob can repeat the protocol with Ed. At that point, the other instances of the distributed database will be able to identify that Alice owns one of 4 wallets, but will not know which. After 10 such runs, Alice owns one wallet out of $2^{10}$, which is 1024. After 20 runs, the set is over a million. After 30, it is over a billion. After 40, it is over a trillion. The protocol should take a fraction of a second to run. But even if each protocol takes a full second to run, anyone attempting to anonymize their wallet will have randomly swapped with each other in much less than a minute. Observers know that Alice owns one of the resulting wallets, but do not know which one.

This system is less secure if only a few people are trying to anonymize their wallets. For additional security, Alice can wait a time period (e.g., a day, an hour, a week, etc.) and then further anonymize her final wallet. In this manner, she can eventually hide among a crowd that includes the other instances of the distributed database who tried to anonymize over a very long period. The more instances of the distributed database that use the system, the faster she can achieve her goal.

This system can potentially be compromised if the attacker can identify Alice's IP address as she communicates with the network implementing the distributed database (e.g., the internet). If the attacker identifies Alice running the protocol from a given IP address, and then immediately sees someone running the protocol on wallet W2 from that same address, they can conclude that Alice owns wallet W2. In some instances, IP addresses can be anonymized. For example, an anonymous communication network (e.g., the Tor network) can be used to achieve anonymous communication. Then, the remaining instances of the distributed database can identify that W2 ran the protocol and signed transactions, but will not be able to identify whether W2 is using Alice's computer or Bob's computer.

In some jurisdictions, a government may want to ensure through legislation that it can monitor currency flows to prevent crimes such as money laundering and tax evasion, while still allowing citizens to be anonymous from spying (e.g., by their neighbors, criminals, foreign governments, etc.). In some instances, the above-described anonymity method and system can support such legislation. In such instances, the government can create or approve a certain Certificate Authority (CA), or several CAs, to create and/or define encrypted certificates that prove a wallet is associated with a certain person. The encryption can be such that only the government can decrypt it (perhaps only with a court order). If Alice creates and/or defines a wallet, she can optionally have such a certificate attached to the wallet, which means that her neighbors cannot see that the wallet belongs to Alice, but the government can decrypt the certificate and identify Alice as the wallet owner. The government might insist that employers within its country can only deposit money into wallets that have such a certificate, and that stores in that country only accept payments from wallets with such a certificate. Then, Alice can perform the above protocol repeatedly to create and/or define a chain of wallets, and obtain the appropriate certificate for the first and last wallet in the chain.

While described above as each wallet data structure having a single public-private key pair, in other instances, a wallet data structure can include two public-private key pairs: one for signing and one for encryption. In such an instance, the above described methods can be modified to use the signing key for signing and the encryption key for encryption.

While described above as using a hashgraph and storing and exchanging transactions within events, in other instances any other suitable distributed database and/or distributed ledger technology can be used to implement the above-described methods to facilitate secure and anonymous transactions. For example, in other instances technologies such as blockchain, PAXOS, RAFT, Bitcoin, Ethereum and/or the like can be used to implement such methods. In some instances, a secure timestamp can be added to these technologies (e.g., built on top of them) to implement the above-described methods to facilitate secure and anonymous transactions. In other instances, no timestamp is used as described above.

While described above as being implemented between two different instances of the distributed database, in other instances, the anonymization method can be implemented by more than two instances of the distributed database. For example, in other instances, the "TRANSFER_DOUBLE" transaction can support additional numbers of transactions. For example, a TRANSFER_TRIPLE transaction can be defined to support transfer of data between three different wallet data structures.

While described above as implementing a cryptocurrency, in other instances the transactions within any other type of distributed database can be anonymized. For example, a record of an exchange of goods, authentication of an identity of an individual, authorization to use a specific resource and/or the like can be anonymized. In such instances, this can increase the security of the transaction within the distributed database.

FIGS. 3-6 illustrate examples of a hashgraph according to an embodiment. There are five members, each of which is represented by a dark vertical line. Each circle represents an event. The two downward lines from an event represent the hashes of two previous events. Every event in this example has two downward lines (one dark line to the same member and one light line to another member), except for each member's first event. Time progresses upward. In FIGS. 3-6, compute devices of a distributed database are indicated as Alice, Bob, Carol, Dave and Ed. In should be understood that such indications refer to compute devices structurally and functionally similar to the compute devices 110, 120, 130 and 140 shown and described with respect to FIG. 1.

Figure 7:
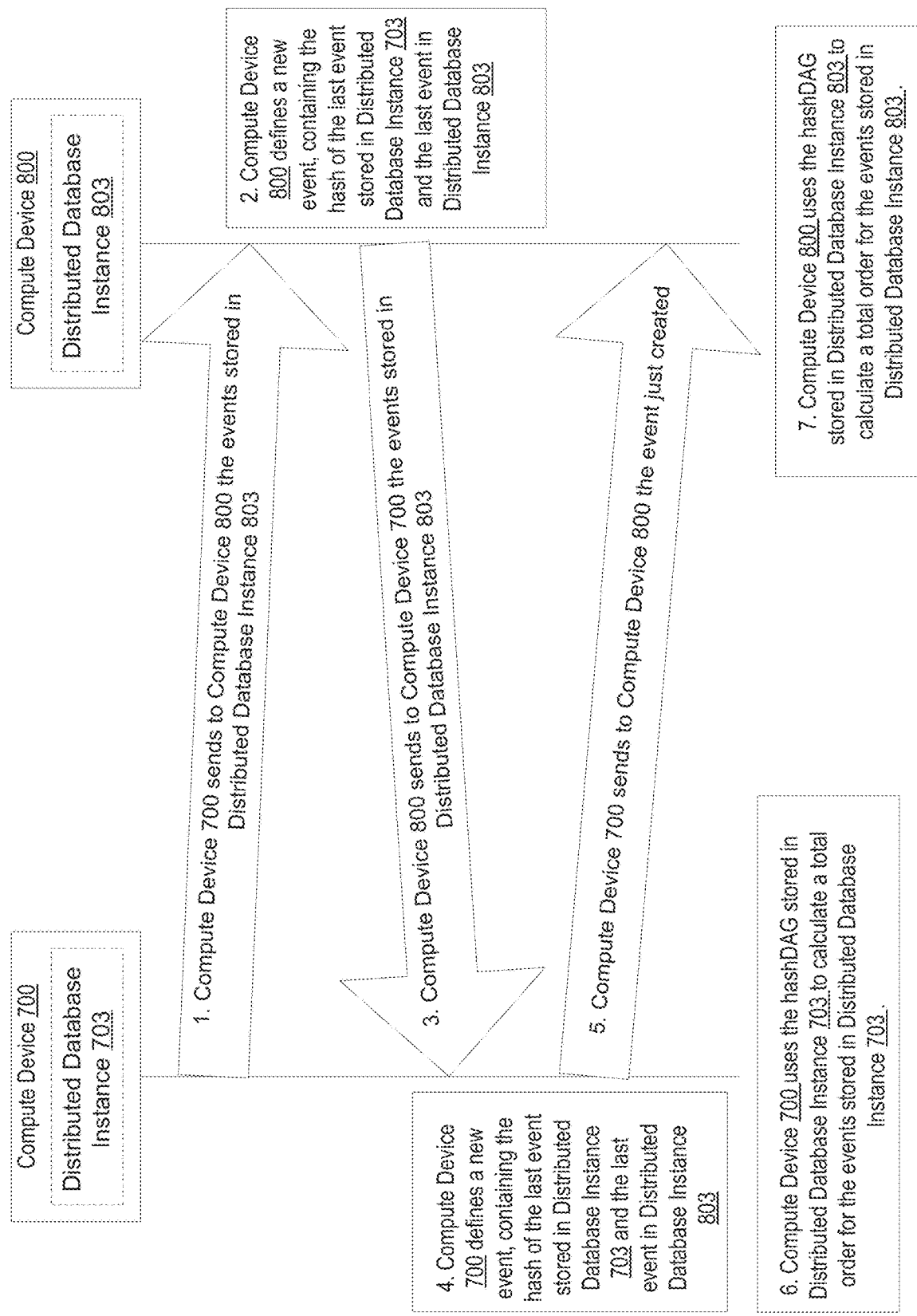
FIG. 7 is a flow diagram that illustrates a communication flow between a first compute device and a second compute device, according to an embodiment.

FIG. 7 illustrates a signal flow diagram of two compute devices syncing events, according to an embodiment. Specifically, in some embodiments, the distributed database instances 703 and 803 can exchange events to obtain convergence. The compute device 700 can select to sync with the compute device 800 randomly, based on a relationship with the compute device 700, based on proximity to the compute device 700, based on an ordered list associated with the compute device 700, and/or the like. In some embodiments, because the compute device 800 can be chosen by the compute device 700 from the set of compute devices belonging to the distributed database system, the compute device 700 can select the compute device 800 multiple times in a row or may not select the compute device 800 for a while. In other embodiments, an indication of the previously selected compute devices can be stored at the compute device 700. In such embodiments, the compute device 700 can wait a predetermined number of selections before being able to select again the compute device 800. As explained above, the distributed database instances 703 and 803 can be implemented in a memory of compute device 700 and a memory of compute device 800, respectively.

The foregoing terms, definitions, and algorithms are used to illustrate the embodiments and concepts described in FIGS. 8-12. FIGS. 13A and 13B illustrate a first example application of a consensus method and/or process shown in mathematical form. FIGS. 14A and 14B illustrate a second example application of a consensus method and/or process shown in mathematical form.

Example System 1

If the compute device 700 is called Alice, and the compute device 800 is called Bob, then synchronization between them can be as illustrated in FIG. 7. A sync between Alice and Bob can be as follows:

Alice sends Bob the events stored in distributed database 703.
Bob creates and/or defines a new event which contains:
 a hash of the last event Bob created and/or defined
 a hash of the last event Alice created and/or defined
 a digital signature by Bob of the above
Bob sends Alice the events stored in distributed database 803.
Alice creates and/or defines a new event.
Alice sends Bob that event.
Alice calculates a total order for the events, as a function of a hashgraph
Bob calculates a total order for the events, as a function of a hashgraph At any given time, a member can store the events received so far, along with an identifier associated with the compute device and/or distributed database instance that created and/or defined each event. Each event contains the hashes of two earlier events, except for an initial event (which has no parent hashes), and the first event for each new member (which has a single parent event hash, representing the event of the existing member that invited them to join). A diagram can be drawn representing this set of events. It can show a vertical line for each member, and a dot on that line for each event created and/or defined by that member. A diagonal line is drawn between two dots whenever an event (the higher dot) includes the hash of an earlier event (the lower dot). An event can be said to be linked to another event if that event can reference the other event via a hash of that event (either directly or through intermediary events).

Figure 3:
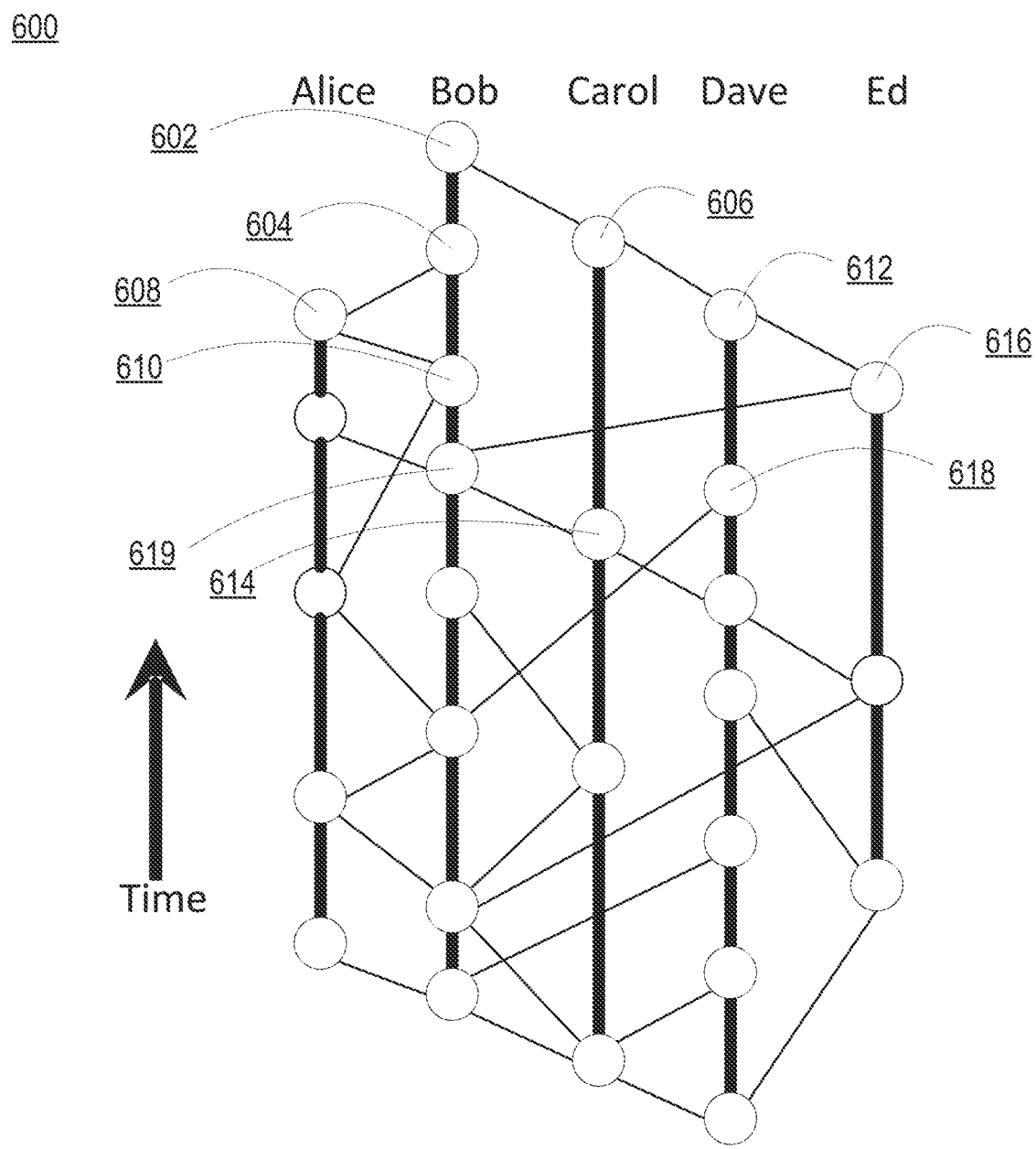
FIGS. 3-6 illustrate examples of a hashgraph, according to an embodiment.

For example, FIG. 3 illustrates an example of a hashgraph 600. Event 602 is created and/or defined by Bob as a result of and after syncing with Carol. Event 602 includes a hash of event 604 (the previous event created and/or defined by Bob) and a hash of event 606 (the previous event created and/or defined by Carol). In some embodiments, for example, the hash of event 604 included within event 602 includes a pointer to its immediate ancestor events, events 608 and 610. As such, Bob can use the event 602 to reference events 608 and 610 and reconstruct the hashgraph using the pointers to the prior events. In some instances, event 602 can be said to be linked to the other events in the hashgraph 600 since event 602 can reference each of the events in the hashgraph 600 via earlier ancestor events. For example, event 602 is linked to event 608 via event 604. For another example, event 602 is linked to event 616 via events 606 and event 612.

Example System 2

The system from Example System 1, where the event also includes a "payload" of transactions or other information to record. Such a payload can be used to update the events with any transactions and/or information that occurred and/or was defined since the compute device's immediate prior event. For example, the event 602 can include any transactions performed by Bob since event 604 was created and/or defined. Thus, when syncing event 602 with other compute devices, Bob can share this information. Accordingly, the transactions performed by Bob can be associated with an event and shared with the other members using events.

Example System 3

The system from Example System 1, where the event also includes the current time and/or date, useful for debugging, diagnostics, and/or other purposes. The time and/or date can be the local time and/or date when the compute device (e.g., Bob) creates and/or defines the event. In such embodiments, such a local time and/or date is not synchronized with the remaining devices. In other embodiments, the time and/or date can be synchronized across the devices (e.g., when exchanging events). In still other embodiments, a global timer can be used to determine the time and/or date.

Example System 4

The system from Example System 1, where Alice does not send Bob events created and/or defined by Bob, nor ancestor events of such an event. An event x is an ancestor of an event y if y contains the hash of x, or y contains the hash of an event that is an ancestor of x. Similarly stated, in such embodiments Bob sends Alice the events not yet stored by Alice and does not send events already stored by Alice.

Figure 4:
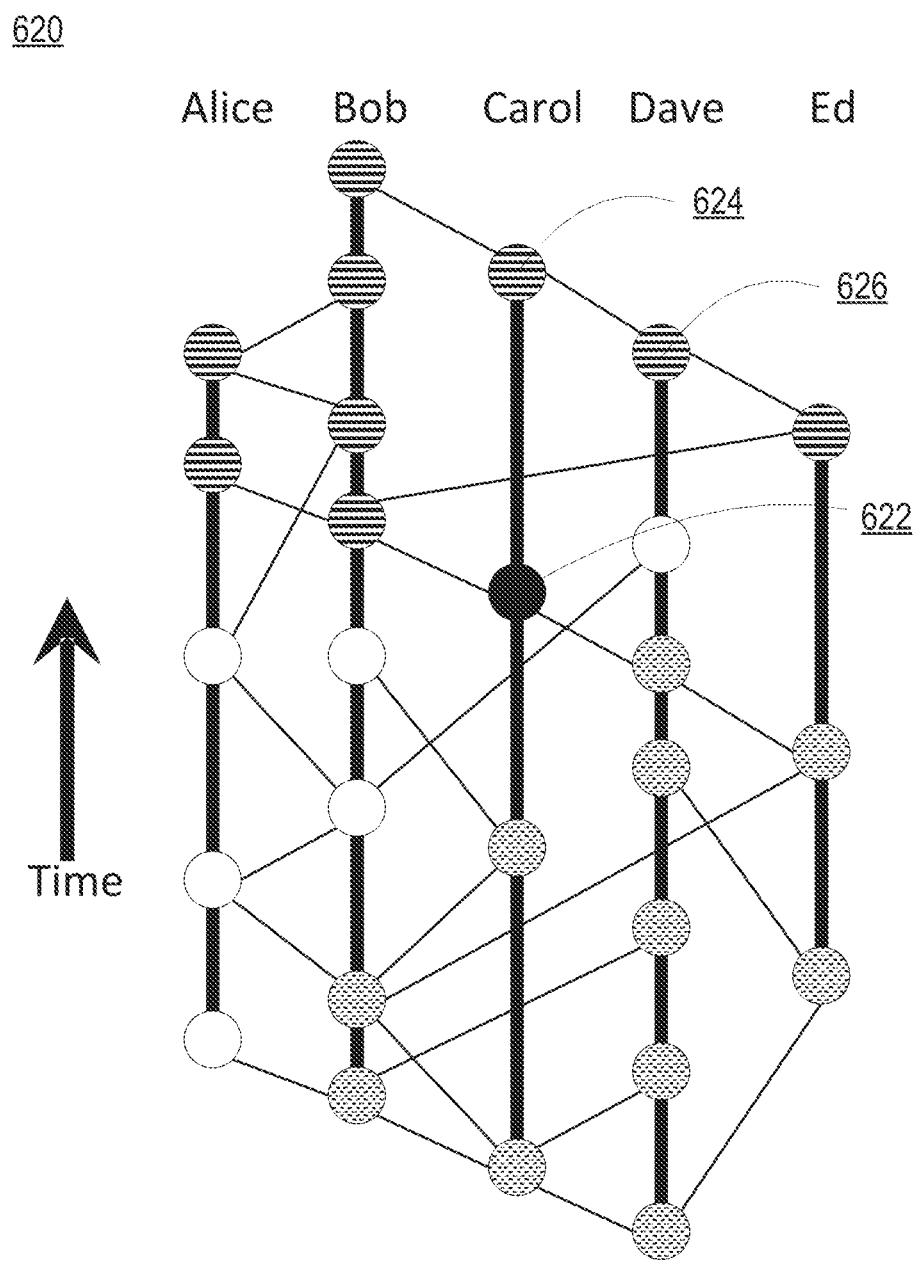
Figure 5:
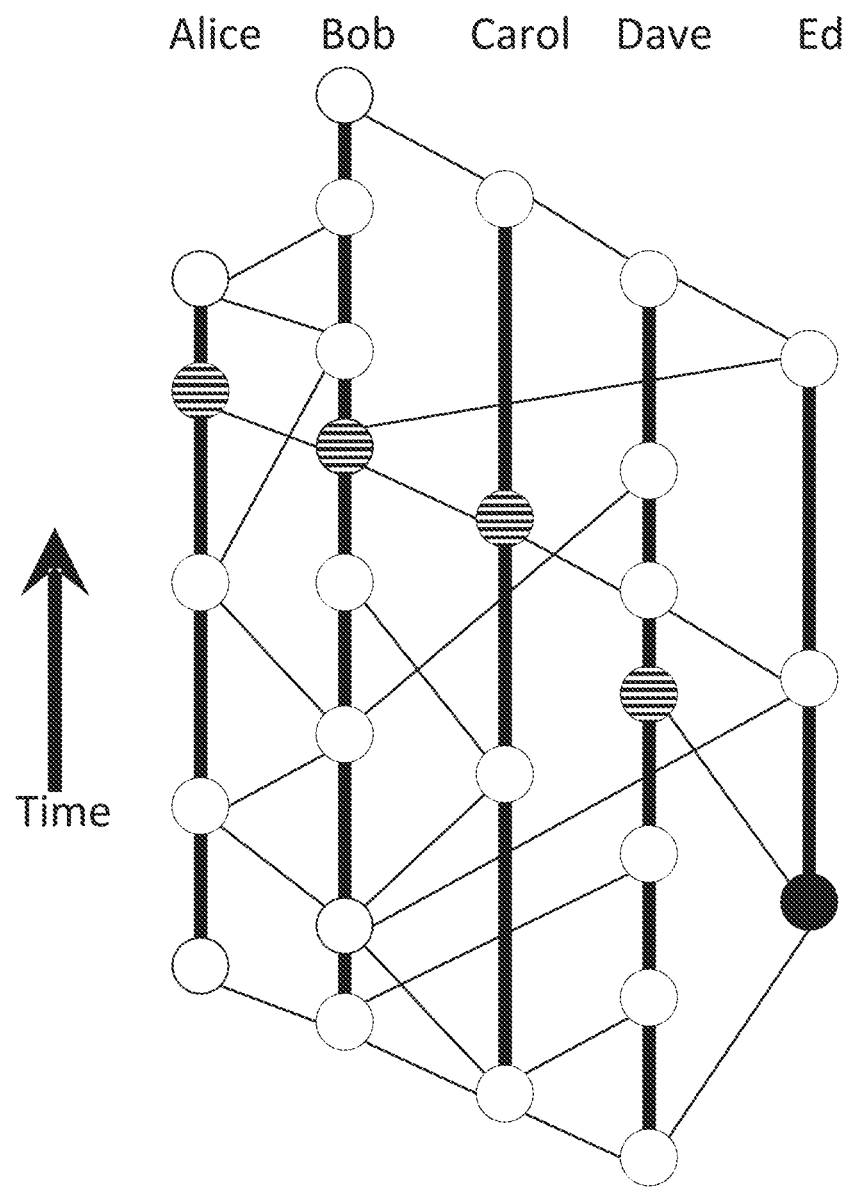

For example, FIG. 4 illustrates an example hashgraph 620 illustrating the ancestor events (dotted circles) and descendent events (striped circles) of the event 622 (the black circle). The lines establish a partial order on the events, where the ancestors come before the black event, and the descendants come after the black event. The partial order does not indicate whether the white events are before or after the black event, so a total order is used to decide their sequence. For another example, FIG. 5 illustrates an example hashgraph illustrating one particular event (solid circle) and the first time each member receives an indication of that event (striped circles). When Carol syncs with Dave to create and/or define event 624, Dave does not send to Carol ancestor events of event 622 since Carol is already aware of and has received such events. Instead, Dave sends to Carol the events Carol has yet to receive and/or store in Carol's distributed database instance. In some embodiments, Dave can identify what events to send to Carol based on what Dave's hashgraph reveals about what events Carol has previously received. Event 622 is an ancestor of event 626. Therefore, at the time of event 626, Dave has already received event 622. FIG. 4 shows that Dave received event 622 from Ed who received event 622 from Bob who received event 622 from Carol. Furthermore, at the time of event 624, event 622 is the last event that Dave has received that was created and/or defined by Carol. Therefore, Dave can send Carol the events that Dave has stored other than event 622 and its ancestors. Additionally, upon receiving event 626 from Dave, Carol can reconstruct the hashgraph based on the pointers in the events stored in Carol's distributed database instance. In other embodiments, Dave can identify what events to send to Carol based on Carol sending event 622 to Dave (not shown in FIG. 4) and Dave identifying using event 622 (and the references therein) to identify the events Carol has already received.

Example System 5

The system from Example System 1 where both members send events to the other in an order such that an event is not sent until after the recipient has received and/or stored the ancestors of that event. Accordingly, the sender sends events from oldest to newest, such that the recipient can check the two hashes on each event as the event is received, by comparing the two hashes to the two ancestor events that were already received. The sender can identify what events to send to the receiver based on the current state of the sender's hashgraph (e.g., a database state variable defined by the sender) and what that hashgraph indicates the receiver has already received. Referring to FIG. 3, for example, when Bob is syncing with Carol to define event 602, Carol can identify that event 619 is the last event created and/or defined by Bob that Carol has received. Therefore Carol can determine that Bob knows of that event, and its ancestors. Thus Carol can send Bob event 618 and event 616 first (i.e., the oldest events Bob has yet to receive that Carol has received). Carol can then send Bob event 612 and then event 606. This allows Bob to easily link the events and reconstruct Bob's hashgraph. Using Carol's hashgraph to identify what events Bob has yet to receive can increase the efficiency of the sync and can reduce network traffic since Bob does not request events from Carol.

In other embodiments, the most recent event can be sent first. If the receiver determines (based on the hash of the two previous events in the most recent event and/or pointers to previous events in the most recent event) that they have not yet received one of the two previous events, the receiver can request the sender to send such events. This can occur until the receiver has received and/or stored the ancestors of the most recent event. Referring to FIG. 3, in such embodiments, for example, when Bob receives event 606 from Carol, Bob can identify the hash of event 612 and event 614 in event 606. Bob can determine that event 614 was previously received from Alice when creating and/or defining event 604. Accordingly, Bob does not need to request event 614 from Carol. Bob can also determine that event 612 has not yet been received. Bob can then request event 612 from Carol. Bob can then, based on the hashes within event 612, determine that Bob has not received events 616 or 618 and can accordingly request these events from Carol. Based on events 616 and 618, Bob will then be able to determine that he has received the ancestors of event 606.

Example System 6

The system from Example System 5 with the additional constraint that when a member has a choice between several events to send next, the event is chosen to minimize the total number of bytes sent so far created and/or defined by that member. For example, if Alice has only two events left to send Bob, and one is 100 bytes and was created and/or defined by Carol, and one is 10 bytes and was created and/or defined by Dave, and so far in this sync Alice has already sent 200 bytes of events by Carol and 210 by Dave, then Alice should send the Dave event first, then subsequently send the Carol event. Because 210+10<100+200. This can be used to address attacks in which a single member either sends out a single gigantic event, or a flood of tiny events. In the case in which the traffic exceeds a byte limit of most members (as discussed with respect to Example System 7), the method of Example System 6 can ensure that the attacker's events are ignored rather than the events of legitimate users. Similarly stated, attacks can be reduced by sending the smaller events before bigger ones (to defend against one giant event tying up a connection). Moreover, if a member can't send each of the events in a single sync (e.g., because of network limitation, member byte limits, etc.), then that member can send a few events from each member, rather than merely sending the events defined and/or created by the attacker and none (of few) events created and/or defined by other members.

Example System 7

The system from Example System 1 with an additional first step in which Bob sends Alice a number indicating a maximum number of bytes he is willing to receive during this sync, and Alice replies with her limit. Alice then stops sending when the next event would exceed this limit. Bob does the same. In such an embodiment, this limits the number of bytes transferred. This may increase the time to convergence, but will reduce the amount of network traffic per sync.

Example System 8

The system from Example System 1, in which the following steps added at the start of the syncing process:
  Alice identifies S, the set of events that she has received and/or stored, skipping events that were created and/or defined by Bob or that are ancestors of events created and/or defined by Bob.
  Alice identifies the members that created and/or defined each event in S, and sends Bob the list of the member's ID numbers. Alice also send a number of events that were created and/or defined by each member that she has already received and/or stored.

Bob replies with a list of how many events he has received that were created and/or defined by the other members. Alice then sends Bob only the events that he has yet to receive. For example, if Alice indicates to Bob that she has received 100 events created and/or defined by Carol, and Bob replies that he has received 95 events created and/or defined by Carol, then Alice will send only the most recent 5 events created and/or defined by Carol.

Example System 9

The system from Example System 1, with an additional mechanism for identifying and/or handling cheaters. Each event contains two hashes, one from the last event created and/or defined by that member (the "self hash"), and one from the last event created and/or defined by another member (the "foreign hash"). If a member creates and/or defines two different events with the same self hash, then that member is a "cheater". If Alice discovers Dave is a cheater, by receiving two different events created and/or defined by him with the same self hash, then she stores an indicator that he is a cheater, and refrains from syncing with him in the future. If she discovers he is a cheater and yet still syncs with him again and creates and/or defines a new event recording that fact, then Alice becomes a cheater, too, and the other members who learn of Alice further syncing with Dave stop syncing with Alice. In some embodiments, this only affects the syncs in one way. For example, when Alice sends a list of identifiers and the number of events she has received for each member, she doesn't send an ID or count for the cheater, so Bob won't reply with any corresponding number. Alice then sends Bob the cheater's events that she has received and for which she hasn't received an indication that Bob has received such events. After that sync is finished, Bob will also be able to determine that Dave is a cheater (if he hasn't already identified Dave as a cheater), and Bob will also refuse to sync with the cheater.

Example System 10

The system in Example System 9, with the addition that Alice starts a sync process by sending Bob a list of cheaters she has identified and of whose events she is still storing, and Bob replies with any cheaters he has identified in addition to the cheaters Alice identified. Then they continue as normal, but without giving counts for the cheaters when syncing with each other.

Example System 11

The system in Example System 1, with a process that repeatedly updates a current state (e.g., as captured by a database state variable defined by a member of the system) based on transactions inside of any new events that are received during syncing. This also can include a second process that repeatedly rebuilds that state (e.g., the order of events), whenever the sequence of events changes, by going back to a copy of an earlier state, and recalculating the present state by processing the events in the new order. In some embodiments, the current state is a state, balance, condition, and/or the like associated with a result of the transactions. Similarly stated, the state can include the data structure and/or variables modified by the transactions. For example, if the transactions are money transfers between bank accounts, then the current state can be the current balance of the accounts. For another example, if the transactions are associated with a multiplayer game, the current state can be the position, number of lives, items obtained, sate of the game, and/or the like associated with the game.

Example System 12

The system in Example System 11, made faster by the use of "fast clone" arrayList to maintain the state (e.g., bank account balances, game state, etc.). A fast clone arrayList is a data structure that acts like an array with one additional feature: it supports a "clone" operation that appears to create and/or define a new object that is a copy of the original. The close acts as if it were a true copy, because changes to the clone do not affect the original. The cloning operation, however, is faster than creating a true copy, because creating a clone does not actually involve copying and/or updating the entire contents of one arrayList to another. Instead of having two clones and/or copies of the original list, two small objects, each with a hash table and a pointer to the original list, can be used. When a write is made to the clone, the hash table remembers which element is modified, and the new value. When a read is performed on a location, the hash table is first checked, and if that element was modified, the new value from the hash table is returned. Otherwise, that element from the original arrayList is returned. In this way, the two "clones" are initially just pointers to the original arrayList. But as each is modified repeatedly, it grows to have a large hash table storing differences between itself and the original list. Clones can themselves be cloned, causing the data structure to expand to a tree of objects, each with its own hash table and pointer to its parent. A read therefore causes a walk up the tree until a vertex is found that has the requested data, or the root is reached. If vertex becomes too large or complex, then it can be replaced with a true copy of the parent, the changes in the hash table can be made to the copy, and the hash table discarded. In addition, if a clone is no longer needed, then during garbage collection it can be removed from the tree, and the tree can be collapsed.

Example System 13

The system in Example System 11, made faster by the use of a "fast clone" hash table to maintain the state (e.g., bank account balances, game state, etc.). This is the same as System 12, except the root of the tree is a hash table rather than an arrayList.

Example System 14

The system in Example System 11, made faster by the use of a "fast clone" relational database to maintain the state (e.g., bank account balances, game state, etc.). This is an object that acts as a wrapper around an existing Relational Database Management System (RDBMS). Each apparent "clone" is actually an object with an ID number and a pointer to an object containing the database. When the user's code tries to perform a Structure Query Language (SQL) query on the database, that query is first modified, then sent to the real database. The real database is identical to the database as seen by the client code, except that each table has one additional field for the clone ID. For example, suppose there is an original database with clone ID 1, and then two clones of the database are made, with IDs 2 and 3. Each row in each table will have a 1, 2, or 3 in the clone ID field. When a query comes from the user code into clone 2, the query is modified so that the query will only read from rows that have a 2 or 1 in that field. Similarly, reads to 3 look for rows with a 3 or 1 ID. If the Structured Query Language (SQL) command goes to clone 2 and says to delete a row, and that row has a 1, then the command should just change the 1 to a 3, which marks the row as no longer being shared by clones 2 and 3, and now just being visible to 3. If there are several clones in operation, then several copies of the row can be inserted, and each can be changed to the ID of a different clone, so that the new rows are visible to the clones except for the clone that just "deleted" the row. Similarly, if a row is added to clone 2, then the row is added to the table with an ID of 2. A modification of a row is equivalent to a deletion then an insertion. As before, if several clones are garbage collected, then the tree can be simplified. The structure of that tree will be stored in an additional table that is not accessible to the clones, but is purely used internally.

Example System 15

The system in Example System 11, made faster by the use of a "fast clone" file system to maintain the state. This is an object that acts as a wrapper around a file system. The file system is built on top of the existing file system, using a fast clone relational database to manage the different versions of the file system. The underlying file system stores a large number of files, either in one directory, or divided up according to filename (to keep directories small). The directory tree can be stored in the database, and not provided to the host file system. When a file or directory is cloned, the "clone" is just an object with an ID number, and the database is modified to reflect that this clone now exists. If a fast clone file system is cloned, it appears to the user as if an entire, new hard drive has been created and/or defined, initialized with a copy of the existing hard drive. Changes to one copy can have no effect on the other copies. In reality, there is just one copy of each file or directory, and when a file is modified through one clone the copying occurs.

Example System 16

The system in Example System 15 in which a separate file is created and/or defined on the host operating system for each N-byte portion of a file in the fast clone file system. N can be some suitable size, such as for example 4096 or 1024. In this way, if one byte is changed in a large file, only one chunk of the large file is copied and modified. This also increases efficiency when storing many files on the drive that differ in only a few bytes.

Example System 17

The system in Example System 11 where each member includes in some or all of the events they create and/or define a hash of the state at some previous time, along with the number of events that occurred up to that point, indicating that the member recognizes and/or identifies that there is now a consensus on the order of events. After a member has collected signed events containing such a hash from a majority of the users for a given state, the member can then store that as proof of the consensus state at that point, and delete from memory the events and transactions before that point.

Example System 18

The system in Example System 1 where operations that calculate a median or a majority is replaced with a weighted median or weighted majority, where members are weighted by their "stake". The stake is a number that indicates how much that member's vote counts. The stake could be holdings in a crypto currency, or just an arbitrary number assigned when the member is first invited to join, and then divided among new members that the member invites to join. Old events can be discarded when enough members have agreed to the consensus state so that their total stake is a majority of the stake in existence. If the total order is calculated using a median of ranks contributed by the members, then the result is a number where half the members have a higher rank and half have a lower. On the other hand, if the total order is calculated using the weighted median, then the result is a number where about half of the total stake is associated with ranks lower than that, and half above. Weighted voting and medians can be useful in preventing a Sybil attack, where one member invites a huge number of "sock puppet" users to join, each of whom are simply pseudonyms controlled by the inviting member. If the inviting member is forced to divide their stake with the invitees, then the sock puppets will not be useful to the attacker in attempts to control the consensus results. Accordingly, proof-of-stake may be useful in some circumstances.

Example System 19

The system in Example System 1 in which instead of a single, distributed database, there are multiple databases in a hierarchy. For example, there might be a single database that the users are members of, and then several smaller databases, or "chunks", each of which has a subset of the members. When events happen in a chunk, they are synced among the members of that chunk and not among members outside that chunk. Then, from time to time, after a consensus order has been decided within the chunk, the resulting state (or events with their consensus total order) can be shared with the entire membership of the large database.

Example System 20

The system in Example System 11, with the ability to have an event that updates the software for updating the state (e.g., as captured by a database state variable defined by a member of the system). For example, events X and Y can contain transactions that modify the state, according to software code that reads the transactions within those events, and then updates the state appropriately. Then, event Z can contain a notice that a new version of the software is now available. If a total order says the events happen in the order X, Z, Y, then the state can be updated by processing the transactions in X with the old software, then the transactions in Y with the new software. But if the consensus order was X, Y, Z, then both X and Y can be updated with the old software, which might give a different final state. Therefore, in such embodiments, the notice to upgrade the code can occur within an event, so that the community can achieve consensus on when to switch from the old version to the new version. This ensures that the members will maintain synchronized states. It also ensures that the system can remain running, even during upgrades, with no need to reboot or restart the process.

Example System 21

The systems described above are expected to create and/or achieve an efficient convergence mechanism for distributed consensus, with eventual consensus. Several theorems can be proved about this, as shown in the following.

Figure 10:
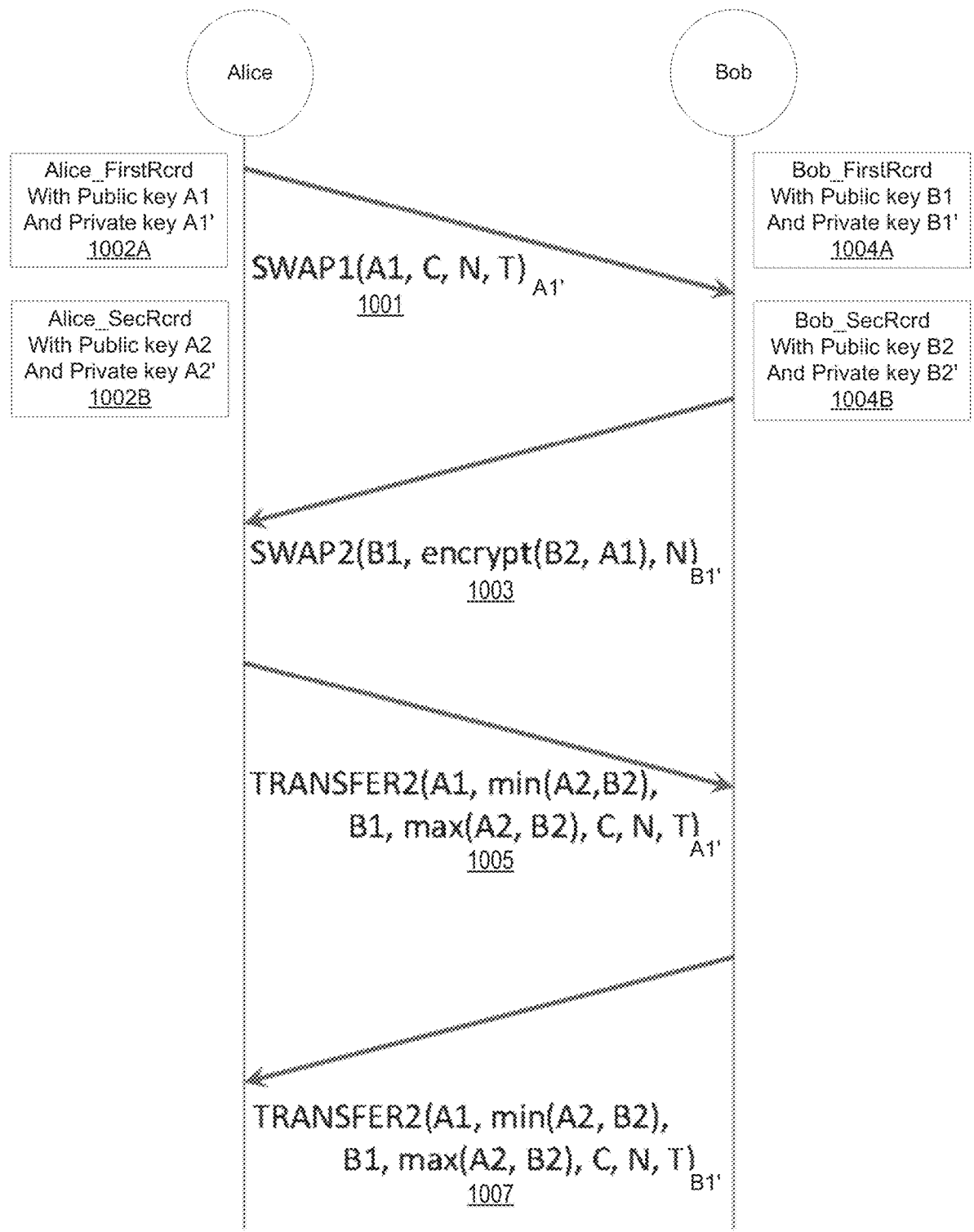
FIG. 10 is an example of a graphical representation of an anonymous database transaction between two compute devices, according to an embodiment.

FIG. 10 illustrates member Alice having a first database record (e.g., wallet 1002A) and a second database record (e.g., wallet 1002B) and member Bob having a first database record (e.g., wallet 1004A) and a second database record (e.g., wallet 1004B). As discussed above, Alice and Bob can instantiate or define, via a compute device, a new database record, by posting a command such as wallet(W, K), with a public-private key pair as parameters (e.g., W being the public key logically related to the new record and K being the private key logically related to the new record). The distributed database can track and/or keep a record of a value corresponding to an amount of a digital asset (e.g., cryptocurrency) stored in, for example, Alice's first wallet 1002A and Bob's first wallet 1004A. In some instances, members or users of a distributed database can identify that wallet 1002A belongs to Alice and that wallet 1004A belongs to Bob. In such a case, Alice can instantiate and/or define a second wallet (e.g., wallet 1002B) such that, other members or users of the distributed database cannot identify that wallet 1002B belongs to Alice. Differently stated, Alice can define or instantiate anonymous wallet 1002B to keep transactions made to wallet 1002B anonymous to other members or users of the distributed database. Likewise, Bob can instantiate anonymous wallet 1004B and keep transactions made to wallet 1004B anonymous.

Alice's second wallet 1002B and Bob's second wallet 1004B are empty after instantiation, and are not yet part of the distributed database. If Alice posts a direct cryptocurrency transfer from her first wallet 1002A to her second wallet 1002B, such a direct transfer will be visible to other members or users of the distributed database. Likewise, direct transfers of cryptocurrency from Bob's first wallet 1004A to his second wallet 1004B would be visible to other members or users of the distributed database.

Advantageously, in some instances, Alice and Bob can make anonymous transfers from their first wallets to their second wallets executing the transfer protocol or sequence of operations shown in FIG. 10. Some of the operations shown in FIG. 10 have been discussed above (e.g., TRANSER_DOUBLE described above is functionally similar to TRANSFER2 shown in FIG. 10). In such instances, Alice can send a swap request 1001 to Bob. The swap request 1001 can include a public key A1 of Alice's first wallet 1002A, a value C indicating an amount of a digital asset (e.g., cryptocurrency) that Alice would like to transfer to her second wallet 1002B, a random number identifier N (e.g., to identify a series of related transactions associated with the anonymous transfer), and an expiration timestamp T. The swap request 1001 can be made by Alice via a private message to Bob and/or by posting the swap request to a public forum, a public ledger, the distributed database, or other suitable communication media. In some instances, Alice can sign the swap request with the private key A1' corresponding to her first wallet 1002A, thus, Bob can verify using Alice's public key A1 that, for example, Alice is making the swap request.

In some instances, Bob can reply to the swap request 1001 with a swap response 1003. Swap response 1003 can include Bob's public key B1, the random number N (received at 1001), and the public key B2 of Bob's second wallet 1004B encrypted with the public key A1 of Alice's first wallet. Accordingly, only Alice can decrypt the public key of Bob's second wallet 1004B because only Alice has the private key A1' that is paired to the public key of her first wallet (i.e., A1). Likewise, Bob can sign the swap response 1003 with the private key B1' that is paired to the public key of his first wallet 1004A (i.e., B1). Bob can post or send the swap response 1003 using the same communication media used by Alice to send swap request 1001 or to an address, for example, an address of a universal resource locator indicated by Alice. In some instances, Alice can also send to Bob the public key A2 of Alice's second wallet 1002B encrypted with the public key of Bob's first wallet 1002A, such that Bob can privately identify the public key A2 of Alice's second wallet 1002B.

Once Alice receives swap response 1003 she can post transfer command 1005 in the distributed database signed with the private key A1' corresponding to her first wallet 1002A. The transfer command 1005 can include the public key A1 of Alice's first wallet 1002A and the public key B1 of Bob's first wallet 1004A, the amount or value representing the digital asset C intended to be transferred, the random number N, and an expiration timestamp T. As discussed above, timestamp T indicates a time threshold conditioning the transfer command 1005 do be dismissed or nullified if convergence is not reached in the distributed database via a consensus protocol before T. The transfer command 1005 is configured to identify or determine whether the first record or wallet 1102A and the second record or wallet 1104A have at least a value C of the digital asset. The value C of the digital asset can be a numeric value that upon execution of the transfer command 1005 is subtracted from the source records (e.g., wallet 1002A or 1004A) and aggregated to the destination records (e.g., wallet 1002B or 1004B). The transfer command 1005 can also include public key A2 of Alice's second wallet 1002B and public key B2 of Bob's second wallet 1004B.

The public key A2 of Alice's second wallet 1002B and the public key B2 of Bob's second wallet 1004B can each be represented as a string of characters. Each string of characters can have an associated lexicographical value. Prior to posting the transfer command 1005, Alice can sort the public keys A2 and B2 into lexicographical order. Where the transfer command indicates min(A2, B2), Alice can include the minimum of the two strings of characters. Thus, if Alice determines that the string A2 comes before the string of B2 in lexicographical order, Alice will include A2 in the transfer command 1005 (i.e., in place of where min(A2,B2) is indicated in FIG. 10). Similarly, prior to posting the transfer command 1005, Alice can sort the public keys A2 and B2 into lexicographical order to find the maximum of the two strings of characters. Where the transfer command indicates max(A2,B2), Alice can include the maximum of the two stings of characters. Thus, if Alice determines that the string B2 comes after the string of A2 in lexicographical order, Alice will include B2 in the transfer command 1005 (i.e., in place of where max(A2,B2) is indicated in FIG. 10). Differently stated, functions min and max execute a lexicographical comparison of the public keys they received as parameters. Accordingly, while both A2 and B2 will be included in the transfer command 1005, the order of listing A2 and B2 in the transfer command will not be based on the ownership or association of the wallets associated with A2 and B2.

Accordingly, the transfer command 1005 can instruct the distributed database to transfer such that an amount C of a digital asset can be deducted from each of the two source records (e.g., Alice's first wallet 1002A and Bob's first wallet 1002A) and the amount C of the digital asset can be credited to each of the two destination records (e.g., Alice's second wallet 1002B and Bob's second wallet 1004B). The determination of the min and max of the public keys A2 and B2 guarantees that the amount C of the digital asset is transferred to each of Alice's second wallet 1002B and to Bob's second wallet 1004B, while concealing which of the destination wallets 1002B or 1004B is associated with which of the source wallets 1002A or 1004A (and/or which of the destination wallets 1002B or 1004B is associated with Alice and which of the destination wallets is associated with Bob). The sort order given by the min and max functions is unrelated to who owns each wallet, and so conceals that information from other members or users of the distributed database. Thus, after Alice posts the transfer command 1005 other members or users of the distributed database can at most, infer that Alice owns one of the destination wallets (i.e., 1002B or 1004B) to which C amount of a digital asset is being transferred but would not know which one of the two destination wallets 1002B or 1004B is actually owned by Alice (or a user associated with the compute device represented by Alice). Differently stated, an identity of the compute device (e.g., Alice or Bob) associated with a private key (e.g., A2' or B2') paired to a public key (e.g., A2 or B2) logically related to a destination record (e.g., 1002B or 1004B) is concealed among a set of compute devices that includes Alice and Bob.

Bob can post a transfer command 1007 corresponding and/or identical to the transfer command 1005 posted by Alice, but signed with the private key B1' corresponding to Bob's first wallet. Specifically, Bob can execute the same sort as Alice (e.g., a lexicographical sort of the public keys A2 and B2) to post the same transaction as Alice. Alternatively, Alice can send the transfer command 1005 to Bob only and then Bob can post the single transfer command 1007 to the distributed database with both signatures. Thereafter, the distributed database can execute the posted transfer command once consensus is reached, if both signatures are valid. Thus, in some instances of the transfer protocol, both transfer commands 1005 and 1007 can be posted to the distributed database while in other instances, only transfer command 1007 is posted to the distributed database along with both signatures.

While discussed above as Alice and Bob determining the minimum and maximum values of the public keys A2 and B2 of the second wallets, in other implementations, any other deterministic sort can be used to identify an order in which to present the public keys A2 and B2 associated with the destination records. Accordingly, Alice and Bob can both perform the following:

S={A1, B1}
D=sortList({A2, B2})
Post/Send: Transfer2(S, D, C, N, T)

In some other instances, Alice and Bob can send messages to a third-party (e.g., Carol not shown in FIG. 10) such that, Carol posts a transfer command to the distributed database on behalf of Bob and/or Alice. In yet some other instances, a third-party acts as intermediary for the communication associated with the anonymous transfer between Alice and Bob. Thus, when Alice and/or Bob use a third-party as an intermediary, their records (i.e. wallets) can be included in the distributed database and their associated public keys can be used by the distributed database even when the compute devices corresponding to Alice and Bob do not implement the distributed database (or only implement a subset and/or portion of the distributed database). In such a case, another member of the distributed database (e.g., Carol) can receive indications of a database operation, for instance, a request to transfer a value C (indicating an amount of a digital asset) from Alice (similar to swap request 1001), and Carol can pass this request to Bob. Bob can then reply to Alice by sending to Alice via Carol a swap response (similar to swap response 1003). Alice and Bob can then provide indications of database operations, such as their transfer commands (similar to transfer commands 1005 and 1007), to Carol and Carol can post the requested database operations (e.g., transfer commands) to the distributed database.

As another example, in some instances, the compute device corresponding to Alice does not implement the distributed database, however, the compute device corresponding to Bob does. In such a case, Alice can send an indication of a database operation to Carol, and Carol can post a corresponding transfer command to the distributed database on behalf of Alice. Differently stated, the distributed database can include records (i.e., wallets) owned by compute devices that do not implement the distributed database and execute transfer protocols using those records via a third-party compute device that is a member of and/or implements the distributed database.

As yet another example, in some instances, Alice and/or Bob can implement and/or store a portion of the distributed database. Specifically, if a third-party compute device (Carol) is a member of the distributed database and/or implements and/or stores the entire distributed database, Alice and/or Bob can store and/or maintain a portion of what Carol stores. As an example, Alice can store the records associated with her public keys, but not the records associated with other users of the distribute database. Similarly, Bob can store the records associated with his public keys, but not the records associated with other users of the distribute database. In such an instance, while Alice and Bob store a portion of the distributed database, Carol can act as a proxy for Alice and Bob to access the full distributed database.

In some implementations, the distributed database can store an integer "pool size" for each wallet, representing the number of wallets in the set of wallets within which the given wallet is concealed. So if an observer knows only that a wallet X is owned by one of N different members, then a pool size of N can be attached to that wallet, indicating how strongly anonymized it is. Non-anonymized wallets such as 1002A and 1004A can have a pool of 1, because the owner is known, and so observers can narrow down the identity to a set of just 1 individual. Other wallets may be more anonymized if the protocol has been executed multiple times for such wallets. For example, if an observer can identify that wallet A1 is owned by one of PA1 individuals, and that B1 is owned by one of PB1 individuals, then the integer PA1 can be associated with A1 and the integer PB1 can be associated with B1.

In some instances, one or more of the messages 1001, 1003, 1005 and/or 1007 can include PA1 and PB1. Alice and Bob can use PA1 and PB1 to decide whether to continue with the transfer of a digital asset. For example, if Alice has already performed this process 10 times, then PA1 might be 1024. If Bob has not performed this process yet, then PB1 might be 1. Alice might therefore refuse to execute the protocol with Bob, because the result would be to only slightly increase her anonymity, from being concealed in a pool of 1024 wallets to a pool of 1025 wallets. Alice might instead prefer to engage with a wallet with a pool size of 1024, so that the single iteration could increase PA1 from 1024 to 2048. In some instances, a wallet might be associated with a set of wallets instead of an integer. This would be the set of wallets such that an observer can only know that a given member owns one of the wallets in the set, but not know which one. So in the latter example, PA1 would be a set of 1024 wallets, and PB1 would be a set of 1024 wallets. After the protocol is finished, PA1 would expand to be the union of the sets PA1 and PB1. Alice might only agree to engage with a wallet such that this union would be much larger than PA1, so that she doesn't waste time on a process that only increases her anonymity by a small amount.

In some instances, message 1001 can include a parameter indicating the minimum threshold value for PB2 that, for example, Alice is willing to accept. Accordingly, Alice can decide to not continue the swap with Bob if, for example, PB1 is below the minimum value threshold.

In some implementations, one or more of the messages 1001, 1003, 1005 and/or 1007 can include: (1) a string value representing user comments; (2) date and time when a message was submitted; (3) an authorization to divert a fee from a user's wallet(s) to the wallet of the compute device submitting or posting a message or transaction; (4) an authorization to divert a fee from a user's wallet to the compute device(s) that contributed to the anonymization of a compute device Internet Protocol (IP) address (e.g., compute devices in a TOR network); and/or any other suitable metadata.

In other implementations, transfer commands can be implemented with a transfer transaction such as:

TRANSFER2 (S, W, R, D, N, T)

where:

K=number of sending wallets
S=list of sending wallets with public keys {S1, S2, ..., SK}
W=number of coins or amount of a digital asset to withdraw from each wallet {W1, W2, ..., WK}
M=number of receiving wallets
R=list of receiving wallets with public keys {R1, R2, ..., RM}
D=number of coins or amount of a digital asset to deposit in each wallet: {D1, D2, ..., WM}
N=random number
T=expiration timestamp where the sum of the number of coins to withdraw or amount of a digital asset W corresponds to the sum of the number of coins or amounts of the digital asset to deposit in each wallet D, and there are signatures by the private keys associated with the public keys in S. The single transaction TRANSFER2 (S, W, R, D, N, T) can include an attachment signed by such private keys. In some instances, there can be multiple, identical transactions (with same N), each of which having one or more of the signatures, and which together have the required signatures. Other parameters that can be included in the TRANSFER2 command can include (1) a string to communicate comments; (2) a date/time indicating the time when the transfer command was posted; (3) a parameter indicating the authorization to divert a fee from a record (i.e., wallet) to the record (i.e., wallet) of a compute device used as a third-party to post the transfer command; and other suitable metadata.

In other implementations, the transfer commands 1005 and 1007 can be modified to include fewer parameters than the parameters shown in FIG. 10. For instance transfer command 1005 can be posted to the distributed database as TRANSFER2(min(A2,B2), max(A2,B2), N, T)$_{A1'}$ and transfer command 1007 can be posted as TRANSFER2(N,T)$_{B1'}$. In such a case, bandwidth consumed by the excess of parameters is reduced by relying on the uniqueness of the random number N, which uniquely identifies a series of related transactions associated with the anonymous transfer.

Figure 11:
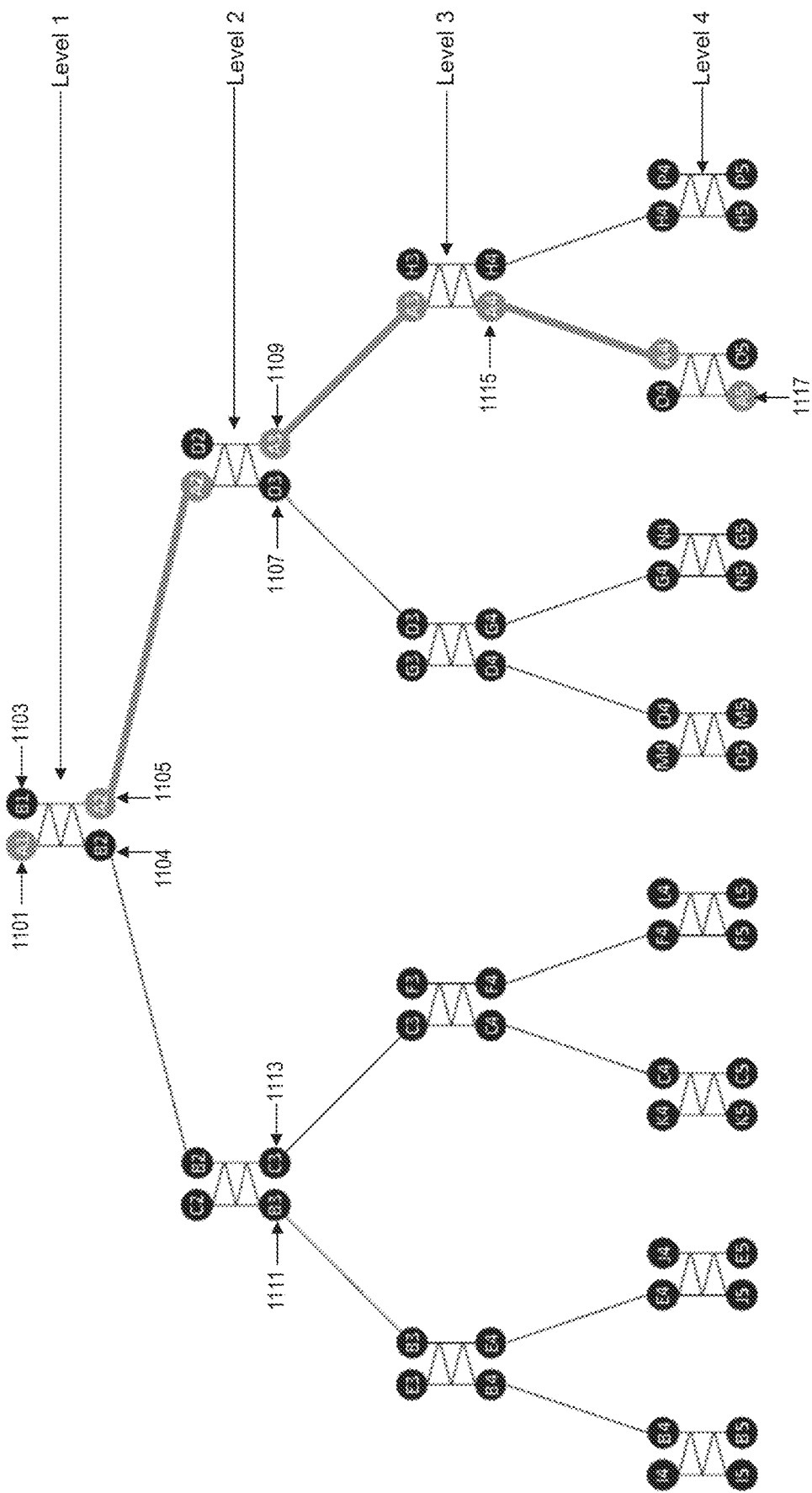
FIG. 11 illustrates a graphical representation of anonymous database transactions throughout multiple levels of a tree representing anonymous database transactions between different compute devices, according to an embodiment.

FIG. 11 shows a four level tree structure produced through the repeated application of the transfer protocol discussed with reference to FIG. 10 to anonymize transfers between wallets. As discussed above, after executing the four messages of the transfer protocol of FIG. 10, the coins in wallet 1002A and 1004A have been transferred to wallets 1002B and 1004B. Members or users of the distributed database can infer from the history of transactions recorded in the distributed database that, for example, a transfer was executed from Alice's first wallet 1101 to either Bob's second wallet 1104 or Alice second wallet 1105. Likewise, it can be inferred that a transfer was executed from Bob's first wallet 1103 to either Bob's second wallet 1104 or Alice's second wallet 1105. Thus at Level 1 of the tree structure, Alice's second wallet 1105 is hidden from other members or users of the distributed database among a pool of two wallets (i.e., wallet 1104 and 1105).

At Level 2, Alice repeats the transfer protocol discussed with reference to FIG. 10 with Dave. Bob repeats the transfer protocol with Carol. Thus, at Level 2, a number of coins or an amount of a digital asset is transferred from Alice's second wallet 1105 to one of the wallets 1107 or 1109 and Alice's wallet is hidden to other members or users of the distributed database among four wallets i.e., wallets 1107, 1109, 1111, and 1113. Alice can keep repeating the transfer protocol discussed with reference to FIG. 10. At each level Alice's wallet is hidden in an exponentially increasing pool of wallets. For instance, at Level 3 Alice repeats the transfer protocol with Hank and her wallet 1115 is hidden in a pool of eight wallets. At Level 4 Alice repeats the transfer protocol with Oscar and her wallet 1117 is hidden in a pool of sixteen wallets. At level forty (not shown in FIG. 11), Alice's wallet is hidden in a pool of over a trillion wallets.

Figure 12:
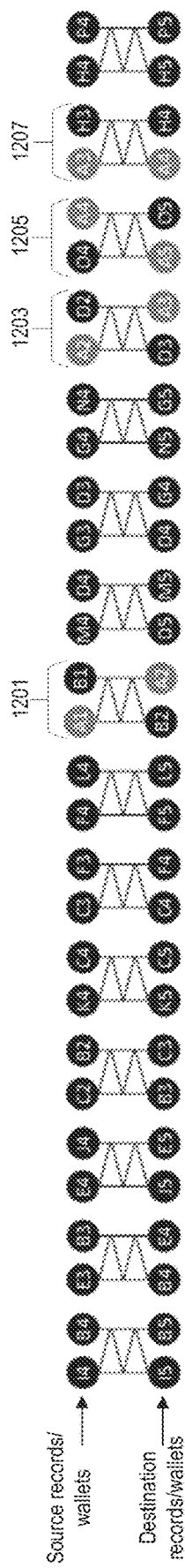
FIG. 12 illustrates a graphical representation of anonymous database transactions executed in parallel between different compute devices, according to an embodiment.

The transfer protocols shown in FIG. 11 can analogously be executed in parallel as shown in FIG. 12. For instance, Alice can execute the transfer protocol with Bob, Dave, Hank, and Oscar such that, the transfers are executed at the same time or nearly the same time. Accordingly, Alice can simultaneously execute and/or post the operations of the transfer protocol shown at 1201, 1203, 1205, and 1207. If at the time that a consensus order is reached all of the wallets configured to transfer an amount C of a digital asset have at least such an amount, then all the transfers are executed in parallel. If at least one of the wallets configured to transfer the amount C of a digital asset does not have such amount, then one or more of the operations of the transfer protocol shown at 1201, 1203, 1205, and 1207 can be stored in the distributed database in an "active" state. Accordingly, operations of the transfer protocol shown at 1201, 1203, 1205, and 1207 stored in an "active" state can be executed at the first point in the consensus history at which the wallets that did not have the amount C of a digital asset have at least such amount.

As discussed above, transfer commands posted to the distributed database can include parameter T to indicate an expiration time. If time T is reached before the operations of the transfer protocol shown at 1201, 1203, 1205, and/or 1207 are executed then, such operations are dismissed and not executed. If at some point, the operations of the transfer protocol shown at 1201, 1203, 1205, and/or 1207 are "active" in the distributed database waiting for a wallet to have a sufficient amount of a digital asset (e.g., amount C) to be executed then, once a sufficient amount of the digital asset is placed in such a wallet, one or more of the operations of the transfer protocol shown at 1201, 1203, 1205, and/or 1207 are triggered in their consensus order. In such a case, the consensus order of the operations of the transfer protocols shown at 1201, 1203, 1205, and/or 1207 can be the latest of the consensus orders of the signed operations included in the operations of such transfer protocols. Thus, operations of the transfer protocols can be delayed or remain in "active" state until the time T is reached. If a sufficient amount of a digital asset to perform operations in an "active" state is not placed in the record before time T then, the operations of the transfer protocols shown at 1201, 1203, 1205, and/or 1207 are dismissed.

In the example shown in FIG. 12 Alice posts to the distributed database the operations of the transfer protocol shown in 1201, 1203, 1205, and 1207, in substantially parallel and at substantially the same time. Such operations will be executed once a consensus order is reached and after the source records or wallets have at least an amount C of a digital asset within a time period T, as specified in the posted transfer commands. Differently stated, if the records associated with public keys (A1, B1) at 1201, (A2, D2) at 1203, (O4, A4) at 1205, and (A3, H3) at 1207 are associated with at least an amount C of a digital asset at any point within the time period T, then the operations of the transfer protocol 1201, 1203, 1205, and 1207 are executed once the public keys are associated with the amount C. If, however, one of the records associated with a public key involved in a transaction does not include at least the amount C of the digital asset at a point within the time period T, then that transfer is canceled (after the time period T expires), while any other transactions would still execute as long as the records associated with the public keys for that transaction are associated with the amount C at a point within the time period T. The execution of the operations of the transfer protocols shown at 1201, 1203, 1205, 1207 can thus be based on whether the source records or wallets have the amount C configured to be transferred and if not, whether the source records or wallets acquire the amount C of the digital asset before the time T elapses. This allows a member (e.g., Alice) to post to the distributed database multiple sequential transactions at the same time, while still allowing the transactions to execute in series.

For example, if Alice posts to the distributed database the operations of the transfer protocol shown in 1201, 1203, 1205, and 1207, in substantially parallel and at substantially the same time, but only the records A1 and B1 include the amount C at the time of posting, only transaction 1201 will execute. This will transfer the amount C to the records associated with A2 and B2. If the record associated with D2 also acquires the amount C within the time period T, transaction 1203 will execute (since the record associated with A2 received the amount C per transaction 1201). Similarly, transaction 1207 and then transaction 1205 can then execute. Thus, the transactions 1201, 1203, 1205 and 1207 can each be posted to the distributed database at the same time, but still execute in a sequential order based on a time that the amount C is received in the records (within the time period T).

Example Theorem 1

If event x precedes event y in the partial order, then in a given member's knowledge of the other members at a given time, each of the other members will have either received an indication of x before y, or will not yet have received an indication of y.

Proof: If event x precedes event y in the partial order, then x is an ancestor of y. When a member receives an indication of y for the first time, that member has either already received an indication of x earlier (in which case they heard of x before y), or it will be the case that the sync provides that member with both x and y (in which case they will hear of x before y during that sync, because the events received during a single sync are considered to have been received in an order consistent with ancestry relationships as described with respect to Example System 5). QED

Example Theorem 2

For any given hashgraph, if x precedes y in the partial order, then x will precede y in the total order calculated for that hashgraph.

Proof: If x precedes y in the partial order, then by theorem 1:

for all i, rank(i,x)<rank(i,y)

where rank(i,x) is the rank assigned by member i to event x, which is 1 if x is the first event received by member i, 2 if it is second, and so on. Let med(x) be the median of the rank(i,x) over all i, and similarly for med(y).

For a given k, choose an i1 and i2 such that rank(i1,x) is the kth-smallest x rank, and rank(i2,y) is the kth-smallest y rank. Then:

rank(i1,x)<rank(i2,y)

This is because rank(i2,y) is greater than or equal to k of the y ranks, each of which is strictly greater than the corresponding x rank. Therefore, rank(i2,y) is strictly greater than at least k of the x ranks, and so is strictly greater than the kth-smallest x rank. This argument holds for any k.

Let n be the number of members (which is the number of i values). Then n must be either odd or even. If n is odd, then let k=(n+1)/2, and the kth-smallest rank will be the median. Therefore, med(x)<med(y). If n is even, then when k=n/2, the kth-smallest x rank will be strictly less than the kth-smallest y rank, and also the (k+1)th-smallest x rank will be strictly less than the (k+1)th-smallest y rank. So the average of the two x ranks will be less than the average of the two y ranks. Therefore, med(x)<med(y). So in both cases, the median of x ranks is strictly less than the median of y ranks. So if the total order is defined by sorting the actions by median rank, then x will precede y in the total order. QED

Example Theorem 3

If a "gossip period" is the amount of time for existing events to propagate through syncing to all the members, then:
- after 1 gossip period: all members have received the events
- after 2 gossip periods: all members agree on the order of those events
- after 3 gossip periods: all members know that agreement has been reached
- after 4 gossip periods: all members obtain digital signatures from all other members, endorsing this consensus order.

Proof: Let S0 be the set of the events that have been created and/or defined by a given time T0. If every member will eventually sync with every other member infinitely often, then with probability 1 there will eventually be a time T1 at which the events in S0 have spread to every member, so that every member is aware of all of the events. That is the end of the first gossip period. Let S1 be the set of events that exist at time T1 and that didn't yet exist at T0. There will then with probability 1 eventually be a time T2 at which every member has received every event in set S1, which is those that existed at time T1. That is the end of the second gossip period. Similarly, T3 is when all events in S2, those existing by T2 but not before T1, have spread to all members. Note that each gossip period eventually ends with probability 1. On average, each will last as long as it takes to perform log 2(n) syncs, if there are n members.

By time T1, every member will have received every event in S0.

By time T2, a given member Alice will have received a record of each of the other members receiving every event in S0. Alice can therefore calculate the rank for every action in S0 for every member (which is the order in which that member received that action), and then sort the events by the median of the ranks. The resulting total order does not change, for the events in S0. That is because the resulting order is a function of the order in which each member first received an indication of each of those events, which does not change. It is possible, that Alice's calculated order will have some events from S1 interspersed among the S0 events. Those S1 events may still change where they fall within the sequence of S0 events. But the relative order of events in S0 will not change.

By time T3, Alice will have learned a total order on the union of S0 and S1, and the relative order of the events in that union will not change. Furthermore, she can find within this sequence the earliest event from S1, and can conclude that the sequence of the events prior to S1 will not change, not even by the insertion of new events outside of S0. Therefore, by time T3, Alice can determine that consensus has been achieved for the order of the events in history prior to the first S1 event. She can digitally sign a hash of the state (e.g., as captured by a database state variable defined by Alice) resulting from these events occurring in this order, and send out the signature as part of the next event she creates and/or defines.

By time T4, Alice will have received similar signatures from the other members. At that point she can simply keep that list of signatures along with the state they attest to, and she can discard the events she has stored prior to the first S1 event. QED The systems described herein describe a distributed database that achieves consensus quickly and securely. This can be a useful building block for many applications. For example, if the transactions describe a transfer of crypto currency from one crypto currency wallet to another, and if the state is simply a statement of the current amount in each wallet, then this system will constitute a crypto currency system that avoids the costly proof-of-work in existing systems. The automatic rule enforcement allows this to add features that are not common in current crypto currencies. For example, lost coins can be recovered, to avoid deflation, by enforcing a rule that if a wallet neither sends nor receives crypto currency for a certain period of time, then that wallet is deleted, and its value is distributed to the other, existing wallets, proportional to the amount they currently contain. In that way, the money supply would not grow or shrink, even if the private key for a wallet is lost.

Another example is a distributed game, which acts like a Massively Multiplayer Online (MMO) game being played on a server, yet achieves that without using a central server. The consensus can be achieved without any central server being in control.

Another example is a system for social media that is built on top of such a database. Because the transactions are digitally signed, and the members receive information about the other members, this provides security and convenience advantages over current systems. For example, an email system with strong anti-spam policies can be implemented, because emails could not have forged return addresses. Such a system could also become a unified social system, combining in a single, distributed database the functions currently done by email, tweets, texts, forums, wikis, and/or other social media.

Other applications can include more sophisticated cryptographic functions, such as group digital signatures, in which the group as a whole cooperates to sign a contract or document. This, and other forms of multiparty computation, can be usefully implemented using such a distributed consensus system.

Another example is a public ledger system. Anyone can pay to store some information in the system, paying a small amount of crypto currency (or real-world currency) per byte per year to store information in the system. These funds can then be automatically distributed to members who store that data, and to members who repeatedly sync to work to achieve consensus. It can automatically transfer to members a small amount of the crypto currency for each time that they sync.

These examples show that the distributed consensus database is useful as a component of many applications. Because the database does not use a costly proof-of-work, possibly using a cheaper proof-of-stake instead, the database can run with a full node running on smaller computers or even mobile and embedded devices.

While described above as an event containing a hash of two prior events (one self hash and one foreign hash), in other embodiments, a member can sync with two other members to create and/or define an event containing hashes of three prior events (one self hash and two foreign hashes). In still other embodiments, any number of event hashes of prior events from any number of members can be included within an event. In some embodiments, different events can include different numbers of hashes of prior events. For example, a first event can include two event hashes and a second event can include three event hashes.

While events are described above as including hashes (or cryptographic hash values) of prior events, in other embodiments, an event can be created and/or defined to include a pointer, an identifier, and/or any other suitable reference to the prior events. For example, an event can be created and/or defined to include a serial number associated with and used to identify a prior event, thus linking the events. In some embodiments, such a serial number can include, for example, an identifier (e.g., media access control (MAC) address, Internet Protocol (IP) address, an assigned address, and/or the like) associated with the member that created and/or defined the event and an order of the event defined by that member. For example, a member that has an identifier of 10 and the event is the 15th event created and/or defined by that member can assign an identifier of 1015 to that event. In other embodiments, any other suitable format can be used to assign identifiers for events.

In other embodiments, events can contain full cryptographic hashes, but only portions of those hashes are transmitted during syncing. For example, if Alice sends Bob an event containing a hash H, and J is the first 3 bytes of H, and Alice determines that of the events and hashes she has stored, H is the only hash starting with J, then she can send J instead of H during the sync. If Bob then determines that he has another hash starting with J, he can then reply to Alice to request the full H. In that way, hashes can be compressed during transmission.

While the example systems shown and described above are described with reference to other systems, in other embodiments any combination of the example systems and their associated functionalities can be implemented to create and/or define a distributed database. For example, Example System 1, Example System 2, and Example System 3 can be combined to create and/or define a distributed database. For another example, in some embodiments, Example System 10 can be implemented with Example System 1 but without Example System 9. For yet another example, Example System 7 can be combined and implemented with Example System 6. In still other embodiments, any other suitable combinations of the example systems can be implemented.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

The invention claimed is:

1. An apparatus, comprising:
a portion of an instance of a distributed database at a first compute device configured to be included within a plurality of compute devices that implement via a network operatively coupled to the plurality of compute devices, the distributed database that includes a first record logically related to a first public key associated with the first compute device; and
a processor of the first compute device operatively coupled to the portion of the instance of the distributed database,
the processor configured to:
receive from a second compute device from the plurality of compute devices, a first public key associated with the second compute device and (1) encrypted with the first public key associated with the first compute device and (2) logically related to a second record of the distributed database;
decrypt, at the first compute device, the first public key associated with the second compute device with a private key paired to the first public key associated with the first compute device;
send to the second compute device a second public key (1) associated with the first compute device, (2) logically related to a third record of the distributed database and (3) encrypted with a second public key associated with the second compute device and logically related to a fourth record of the distributed database;
define a transfer command by executing a lexicographical comparison between the second public key associated with the first compute device and the first public key associated with the second compute device; and
send a signal to post into the distributed database the transfer command configured to transfer a value from each source record from a plurality of source records including the first record and the fourth record to a different destination record from a plurality of destination records including the second record and the third record, the transfer command signed with the private key and configured to be executed such that an identity of a compute device associated with each destination record from the plurality of destination records is concealed among a set of compute devices including the first compute device and the second compute device.

2. The apparatus of claim 1, wherein the instance of the distributed database is a first instance of the distributed database, a second instance of the distributed database at a third compute device from the plurality of compute devices includes a plurality of records including the first record, the second record, the third record and the fourth record,
the first instance of the distributed database not including every record from the plurality of records.

3. The apparatus of claim 1, wherein the transfer command is configured to identify that each source record from the plurality of source records has at least the value prior to transferring the value from each source record from the plurality of source records to a different destination record from the plurality of destination records.

4. The apparatus of claim 1, wherein the transfer command is posted into the distributed database at a time,
when each source record from the plurality of source records does not have at least the value at the time, the transfer command configured to delay the transfer until each record from the plurality of source records has at least the value.

5. The apparatus of claim 1, wherein the transfer command is associated with a time period, the transfer command configured to transfer the value from each record from the plurality of source records to a different destination record from the plurality of destination records when each record from the plurality of source records has at least the value at a time within the time period.

6. The apparatus of claim 1, wherein the transfer command is a first transfer command, the second record is a first destination record, and the set of compute devices is a first set of compute devices,
the processor configured to send a signal to post into the distributed database prior to the first transfer command being executed, a second transfer command configured to transfer the value from the first destination record to a second destination record such that an identity of a compute device associated with a private key corresponding to a public key logically related to the second destination record is concealed among a second set of compute devices including the first set of compute devices,
the second transfer command configured to transfer the value from the first destination record to the second destination record when the first destination record has the value at a time within a time period.

7. The apparatus of claim 1, wherein the processor is further configured to:
send to the second compute device the first public key associated with the first compute device and a numeric value to be subtracted from the first record and aggregated to each destination record from the plurality of destination records via an execution of the transfer command.

8. The apparatus of claim 1, wherein the transfer command is further configured to:
include a time threshold conditioning the transfer command to be nullified when convergence is not reached via a consensus protocol before the time threshold.

9. The apparatus of claim 1, wherein the value corresponds to an amount of a digital asset.

10. An apparatus, comprising:
a portion of an instance of a distributed database at a first compute device configured to be included within a plurality of compute devices that implement via a network operatively coupled to the plurality of compute devices, the distributed database that includes a first record logically related to a first public key associated with the first compute device; and
a processor of the first compute device operatively coupled to the instance of the distributed database,
the processor configured to:
receive from a second compute device from the plurality of compute devices, (1) a first public key associated with the second compute device and (2) a value requested to be transferred from a second record logically related to the first public key associated with the second compute device;
encrypt a second public key associated with the first compute device with the first public key associated with the second compute device to define an encrypted second public key associated with the first compute device;
send, to the second compute device, the encrypted second public key associated with the first compute device;
define a transfer command by executing a lexicographical comparison between the second public key associated with the first compute device and a second public key associated with the second compute device; and
send a signal to post into the distributed database the transfer command configured to transfer the value from each source record from a plurality of source records including the first record and the second record to a different destination record from a plurality of destination records including a third record logically related to the second public key associated with the first compute device and a fourth record logically related to the second public key associated with the second compute device, the transfer command signed with a private key paired to the first public key associated with the first compute device and configured to be executed such that an identity of a compute device associated with each destination record from the plurality of destination records is concealed among a set of compute devices including the first compute device and the second compute device.

11. The apparatus of claim 10, wherein the instance of the distributed database is a first instance of the distributed database, a second instance of the distributed database at a third compute device from the plurality of compute devices includes a plurality of records including the first record, the second record, the third record and the fourth record,
the first instance of the distributed database not including every record from the plurality of records.

12. The apparatus of claim 10, wherein the transfer command is associated with a time period, the transfer command configured to transfer the value from each source record from the plurality of source records to a different destination record from the plurality of destination records when each source record from the plurality of source records has at least the value at a time within the time period.

13. The apparatus of claim 10, wherein the transfer command is a first transfer command, the third record is a first destination record, and the set of compute devices is a first set of compute devices,
the processor configured to send a signal to post into the distributed database prior to the first transfer command being executed, a second transfer command configured to transfer the value from the first destination record to a second destination record such that an identity of a compute device associated with a private key corresponding to a public key logically related to the second destination record is concealed among a second set of compute devices including the first set of compute devices,
the second transfer command configured to transfer the value from the first destination record to the second destination record when the first destination record has the value at a time within a time period.

14. The apparatus of claim 10, wherein the transfer command is further configured to:
include a time threshold conditioning the transfer command to be nullified when convergence is not reached via a consensus protocol before the time threshold.

15. The apparatus of claim 10, wherein the value corresponds to an amount of a digital asset.

\* \* \* \* \*